(12) United States Patent
Ianev et al.

(10) Patent No.: US 11,997,586 B2
(45) Date of Patent: May 28, 2024

(54) NETWORK SLICE QUOTA MANAGEMENT DURING ROAMING

(71) Applicant: NEC Corporation, Tokyo (JP)

(72) Inventors: Iskren Ianev, Lower Earley (GB); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 17/627,936

(22) PCT Filed: Dec. 17, 2020

(86) PCT No.: PCT/JP2020/047159
§ 371 (c)(1),
(2) Date: Jan. 18, 2022

(87) PCT Pub. No.: WO2021/125265
PCT Pub. Date: Jun. 24, 2021

(65) Prior Publication Data
US 2022/0264427 A1 Aug. 18, 2022

(30) Foreign Application Priority Data

Dec. 20, 2019 (EP) .................................... 19219053

(51) Int. Cl.
*H04W 48/02* (2009.01)
*H04L 41/0896* (2022.01)
*H04W 8/06* (2009.01)

(52) U.S. Cl.
CPC ......... *H04W 48/02* (2013.01); *H04L 41/0896* (2013.01); *H04W 8/06* (2013.01)

(58) Field of Classification Search
None
See application file for complete search history.

(56) References Cited

U.S. PATENT DOCUMENTS

| 10,299,128 B1* | 5/2019 | Suthar .................. H04L 9/30 |
| 2019/0053104 A1* | 2/2019 | Qiao .................... H04M 15/66 |
| 2019/0182897 A1* | 6/2019 | Jain .................... H04W 4/80 |
| 2020/0245233 A1* | 7/2020 | Qian .................. H04W 48/18 |

FOREIGN PATENT DOCUMENTS

| EP | 3800916 A1 | 4/2021 |
| WO | 2020/186145 A1 | 9/2020 |
| WO | WO-2020228926 A1 * | 11/2020 ............ H04W 48/18 |
| WO | 2020/250005 | 12/2020 |
| WO | 2021/006090 A1 | 1/2021 |

(Continued)

OTHER PUBLICATIONS

International Search Report for PCT Application No. PCT/JP2020/047159, dated Apr. 21, 2021.

(Continued)

*Primary Examiner* — Ajit Patel
(74) *Attorney, Agent, or Firm* — Sughrue Mion, PLLC

(57) ABSTRACT

The present disclosure proposes solutions for monitoring, controlling and enforcement the number of the UEs per Network Slice quota in roaming. It proposes new Network Slice Quota (NSQ) service and service operations for Network Slice quota subscription, monitoring, update and notification in both, the home network and in the visiting network.

43 Claims, 21 Drawing Sheets

(56) References Cited

FOREIGN PATENT DOCUMENTS

WO    WO-2021089160 A1 *  5/2021   ......... H04L 41/5003

OTHER PUBLICATIONS

English translation of Written opinion for PCT Application No. PCT/JP2020/047159, dated Apr. 21, 2021.
S2-1912736, SA WG2, Nokia et al., "Solution on KI#1: AMF/NSSF based counting of UEs in a Network Slice", Nov. 18-22, pp. 1-7.
3GPP TR 23.700-40 V0.2.0, "Study on Enhancement of Network Slicing Phase 2", 2019-11, pp. 1-29.
S2-1912475, SA WG2, Huawei et al., "Solution of Key Issue #1: Support of network slice related quota on the maximum number of UEs", Nov. 2019, pp. 1-4.
S2-1912476, SA WG2, NEC, "Solution KI#1: Max number of UEs per Network Slice control at registration", Nov. 2019, pp. 1-3.
3GPP TR 21.905: "Vocabulary for 3GPP Specifications". V15.0.0 (Mar. 2018), pp. 1-64.
3GPP TS 23.501: "System Architecture for the 5G System (5GS)", V16.2.0 (Sep. 2019), pp. 1-389.
3GPP TS 23.502: "Procedures for the 5G System (5GS)", V16.2.0 (Sep. 2019), pp. 1-524.
GSMA, "Generic Network Slice Template", Version 1.0, May 23, 2019, pp. 1-60.

* cited by examiner

NETWORK SLICE QUOTA MANAGEMENT DURING ROAMING

This application is a National Stage Entry of PCT/JP2020/047159 filed on Dec. 17, 2020, which claims priority from European Patent Application 19219053.6 filed on Dec. 20, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to network slice quota management during roaming in the so-called '5G' (or 'Next Generation') systems.

ABBREVIATIONS

3GPP 3rd Generation Partnership Project
5GC 5G Core Network
5GS 5G System
5G-AN 5G Access Network
AAA-S Authentication, Authorisation and Accounting Server
AAA-P Authentication, Authorisation and Accounting Proxy
AF Application Function
AMF Access and Mobility Management Function
AUSF Authentication Server Function
DNN Data Network Name
gNB Next generation Node B
GPSI Generic Public Subscriber Identity
GST Generic Slice Template
NAS Non-Access Stratum
NDA Non-Disclosure Agreement
NEF Network Exposure Function
NF Network Function
NG-RAN Next Generation Radio Access Network
NR New Radio
NSQ Network Slice Quota
NSSAA Network Slice Specific Authentication and Authorisation
NSSF Network Slice Selection Function
OAM Operations and Maintenance
PCC Policy and Charging Control
PCF Policy Control Function
PLMN Public land mobile network
(R)AN (Radio) Access Network
RRC Radio Resource Control
SLA Service Level Agreement
UDM Unified Data Management
UDR Unified Data Repository
UE User Equipment

BACKGROUND ART

For the purposes of the present document, the terms and definitions given in 3GPP Technical Report (TR) 21.905 [1] and the following apply. A term defined in the present document takes precedence over the definition of the same term, if any, in 3GPP TR 21.905 [1].

Network slicing features defined in 3GPP release 15 and release 16 enable a great variety of communication services for operators and verticals alike. To enhance the commercial viability of Network Slicing, GSMA 5GJA has introduced in document NG.116 the concept of Generic Slice Template [4] from which several Network Slice Types descriptions can be derived. Some of the parameters in the GST point explicitly to the definition of parameters and bounds on the service delivered to the end customer. However, the enforcement of some of these bounds or of some of these parameters is not supported by the 5GS yet.

For instance, the GST aims at the limitation of the number of PDU sessions per slice, or the number of devices supported per network slice, or the maximum UL or DL data rate per network slice (which is not the same as the AMBR for a UE, rather a rate limitation per UE/S-NSSAI). These parameters cannot be enforced today as the system lacks the ability to do so.

The SA2 SID on Enhancement of Network Slicing Phase 2 [5] aims at identifying the gaps that need to be filled in providing support for the GST parameters enforcement and the suitable solution to address these gaps.

The objective of this study is to identify the gaps in the currently defined 5GS system procedures defined in SA2 owned Technical Specifications to support of GST parameters and to study potential solutions that may address these gaps. The following parameters at least will be under consideration:

Maximum number of UEs per Network Slice
Maximum number of PDU sessions per Network Slice
Maximum UL and DL data rate per UE in a Network Slice
Interaction with SA1 and GSMA is expected for any aspects that need any clarification, as identified as the work progresses.

SUMMARY OF INVENTION

3GPP SA2 Working Group has already started the study on how to support the Generic Slice Template (GST) parameters monitoring, control and enforcement however, the issue with the Service Level Agreement (SLA) quota on the maximum number of UEs per Network Slice in roaming has not been resolved yet. This disclosure proposes solution on how to monitor, control and enforce the SLA quota on maximum number of UEs per Network Slice in roaming.

According to an aspect of the present disclosure, a Network Function node for network slice quota, includes: means for managing network slice quota on a number of user equipment, UE, per network slice.

According to another aspect of the present disclosure, a core network node in a core network, includes: means for sending a first request, to a network function node for network slice quota configured to manage network slice quota on a number of user equipment, UE, per network slice, directly or via a network function node in the core network, for checking availability of a network slice, including information indicating the network slice; means for receiving, from the network function node for network slice quota directly or via the network function node, a first response to the first request, indicating the availability, wherein the checking is performed by the Network Function node for network slice quota, in accordance with the network slice quota on the number of UE per network slice.

According to another aspect of the present disclosure, a controlling method for a Network Function node for network slice quota, the controlling method includes: managing network slice quota on a number of user equipment, UE, per network slice.

According to another aspect of the present disclosure, a controlling method for a core network node in a core network, the controlling method includes: sending a first request, to a network function node for network slice quota configured to manage network slice quota on a number of user equipment, UE, per network slice, directly or via a network function node in the core network, for checking availability of a network slice, including information indicating the network slice; receiving, from the network function node for network slice quota directly or via the network function node, a first response to the first request, indicating the availability, wherein the checking is performed by the Network Function node for network slice quota, in accordance with the network slice quota on the number of UE per network slice.

DESCRIPTION OF EMBODIMENTS

Network Slice Quota management during roaming.

This example aspect describes an exemplary way to monitor, control and enforce the SLA quota restrictions on maximum number of UEs per Network Slice in roaming. A new Network Slice Quota (NSQ) service is proposed which assumes that the Network Slice Quota is managed by a designated network function (e.g. NSQ—Network Slice Quota function/entity or any other notation for a function or entity which monitors, controls and enforces the maximum numbers of UEs per Network Slice quota (e.g. Service Level Agreements (SLA)). This new NSQ can be a new functional entity within any existing network node, e.g. NSSF, AMF, PCF, NWDAF or NSQ can be implemented as a new physical entity). The following Network Slice Quota (NSQ) Service, NSQ operations and potential NSQ service consumers are proposed in Table 1 which are applicable in both cases where the NSQ is represented as a part of an existing network node or it is represented as a new designated network node.

TABLE 1

Network Slice Quota Services provided by NSQ

| Service Name | Service Operation | Service Semantic | Example Consumers |
| --- | --- | --- | --- |
| Noam_NetworkSliceQuota | Availability | Request/Response | AMF, UDM, OAM, NEF, AF |
| | Update | | AMF, UDM, OAM, NEF, AF |
| | Subscribe | Subscribe/Notify | AMF, UDM, OAM, NEF, AF |
| | Unsubscribe | | |
| | Notify | | |

Figure 1:
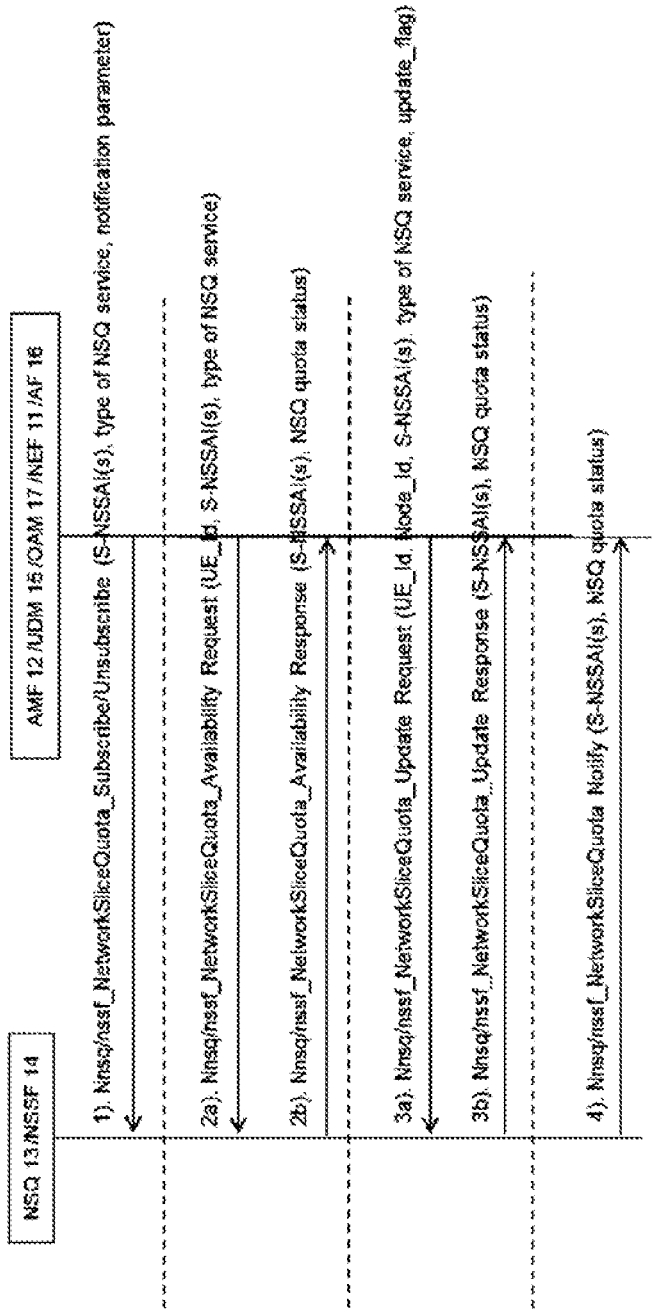
FIG. 1 illustrates in more detail the newly defined Network Slice Quota (NSQ) service and operations.

FIG. 1 illustrates in more detail the newly defined Network Slice Quota (NSQ) 13 service and operations.

- Service operation name: Nnsq/nssf_NetworkSliceQuota_Subscribe/Unsubscribe or any other notation for service operation for the purpose of network slice quota services subscription and unsubscription.

- Description: This service operation enables the AMF 12 to subscribe or unsubscribe for Network Slice Quota (NSQ) related services, e.g. NSQ quota availability check, NSQ quota update, NSQ quota notification.

Input: The S-NSSAI(s) for which the AMF 12 wishes to subscribe or unsubscribe for NSQ services; the type of NSQ service, e.g. "number of UEs per network slice" quota, "number of PDU sessions per network slice" quota. A plurality of kinds of the type of NSQ services can be included as the parameter.

In some example aspects, a new parameter "notification parameter" for indicating the triggers for the Notification, for example, periodic notification, threshold based notification, and event based notification and etc., can be included as parameters.

Potential consumers: AMF 12, UDM 15, OAM 17, NEF 11, AF 16

Service operation name: Nnsq/nssf_NetworkSliceQuota_Availability Request/Response or any other notation for service operation for the purpose of network slice quota availability check.

Description: This service operation enables the AMF 12 to check for the availability of the NSQ quota with the NSQ 13/NSSF 14, e.g. number of UEs per network slice quota availability.

Input (Nnsq/nssf_NetworkSliceQuota_Availability Request) with the following parameters:

The UE_Id(s) which indicate the UE(s) to be checked whether the UE 3 is subject for NSQ control or not (e.g. if the UE(s) have previously been registered with the S-NSSAI for which the NSQ quota availability is to be checked and is still in the list of UEs registered with that S-NSSAI).

The S-NSSAI(s) which the quota availability to be checked.

The type of NSQ service (e.g. "number of UEs per network slice" quota, "number of PDU sessions per network slice" quota).

Output (Nnsq/nssf_NetworkSliceQuota_Availability Response) with the following parameters:

The S-NSSAI(s) which the NSQ quota is being checked.

The NSQ quota status—NSQ quota available/NSQ quota not available or max number of UEs per network slice quota reached/not reached or max number of PDU sessions per network slice quota reached/not reached or any other way to indicate whether NSQ quota is available or not. A plurality of kinds of the NSQ quota statuses can be included as the parameter.

Potential consumers: AMF 12, UDM 15, OAM 17, NEF 11, AF 16

Service operation name: Nnsq/nssf_NetworkSliceQuota_Update Request/Response or any other notation for service operation for the purpose of network slice quota update.

Description: This service operation enables the AMF 12 to update the number of UEs per network slice quota in the NSQ13/NSSF 14 for one or more network slices and get back the current status of the quota for these network slices. It may also enable the AMF 12 to update the number of UEs per network slice quota in the NSQ13/NSSF 14 in case the AMF 12 performs the AMF 12 planed removal procedure or the AMF 12 encounters the restoration procedure.

Input (Nnsq/nssf_NetworkSliceQuota_Update Request) with the following parameters:

The UE_Id(s) which indicates UE(s) that will be added or removed from the network slice quota.

The Node_Id which indicates a node identifier, for example an AMF Name with a globally unique FQDN format, where the Nnsq/nssf_NetworkSliceQuota_Update Request message comes from. In case there is a Node_Id but no UE_Id(s) and the update_flag is set to "decrement" in the Nnsq/nssf_NetworkSliceQuota_Update Request message, the NSQ 13/NSSF 14 decrements the number of registered UE(s) in the NSQ 13/NSSF 14 which are associated with the Node_Id.

The S-NSSAI(s) indicates for which the network slices quota is to be updated;

The type of NSQ service (e.g. "number of UEs per network slice" quota, "number of PDU sessions per network slice" quota).

The update_flag indicates whether to increment the quota or decrement the quota. Alternatively, the update_flag can indicate whether to increment or decrement the current number of UEs per network slice. Along with the quota increment/decrement, the NSQ13/NSSF 14 also adds the UE_Id and the Node_Id to a list of UEs registered with a S-NSSAI at registration and remove from the list at deregistration.

Output (Nnsq/nssf_NetworkSliceQuota_Update Response) with the following parameters:

The S-NSSAI(s) for which the NSQ quota is updated;

The NSQ quota status—the current status of the NSQ quota e.g. the available quota or the current number of UEs per network slice. A plurality of kinds of the NSQ quota statuses can be included as the parameter.

Potential consumers: AMF 12, UDM 15, OAM 17, NEF 11, AF 16

Service operation name: Nnsq/nssf_NetworkSliceQuota_Notify, Nnsq/nssf_NetworkSliceQuota_Notification or any other notation for service operation for the purpose of network slice quota availability notification.

Description: This service operation enables the NSQ 13/NSSF 14 to notify (regularly or based on a trigger or threshold) the current status of the NSQ quota.

Input: UE_Id; the S-NSSA(s) for which the quota is being reported; the type of NSQ service (e.g. number of UEs per network slice quota). A plurality of kinds of the NSQ quota statuses can be included as the parameter.

Potential consumers: AMF 12, UDM 15, OAM 17, NEF 11, AF 16

Model 1 Network Slice Quota Management by the Home PLMN

Figure 2:
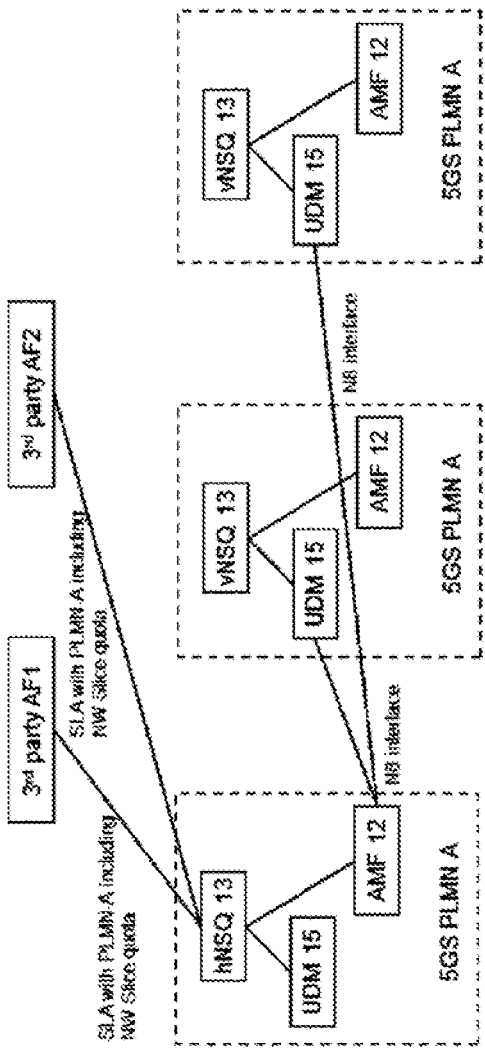
FIG. 2 illustrates schematically an exemplary procedure for Network Slice Quota management during roaming by the home PLMN (hPLMN).

FIG. 2 illustrates schematically an exemplary procedure for Network Slice Quota management during roaming by the home PLMN (hPLMN), i.e. by the home Network Slice Quota (hNSQ 13) function which can be a new functional entity implemented as a new network node or a functional entity within any existing network node (e.g. NSSF 14, AMF 12, PCF, NWDAF). Third party AF (e.g. AF1 and AF2 in FIG. 2) may have associations with the hNSQ 13 of the hPLMN. In roaming, the global Network Slice Quota (e.g. number of UEs per network slice) is counted by the hNSQ 13 in the hPLMN using N8 interface. The hNSQ 13 entity can be a new functional entity within any existing network node, e.g. hNSSF 14, hAMF 12, hPCF, hNWDAF or hNSQ 13 can be implemented as a new designated network node.

Figure 3:
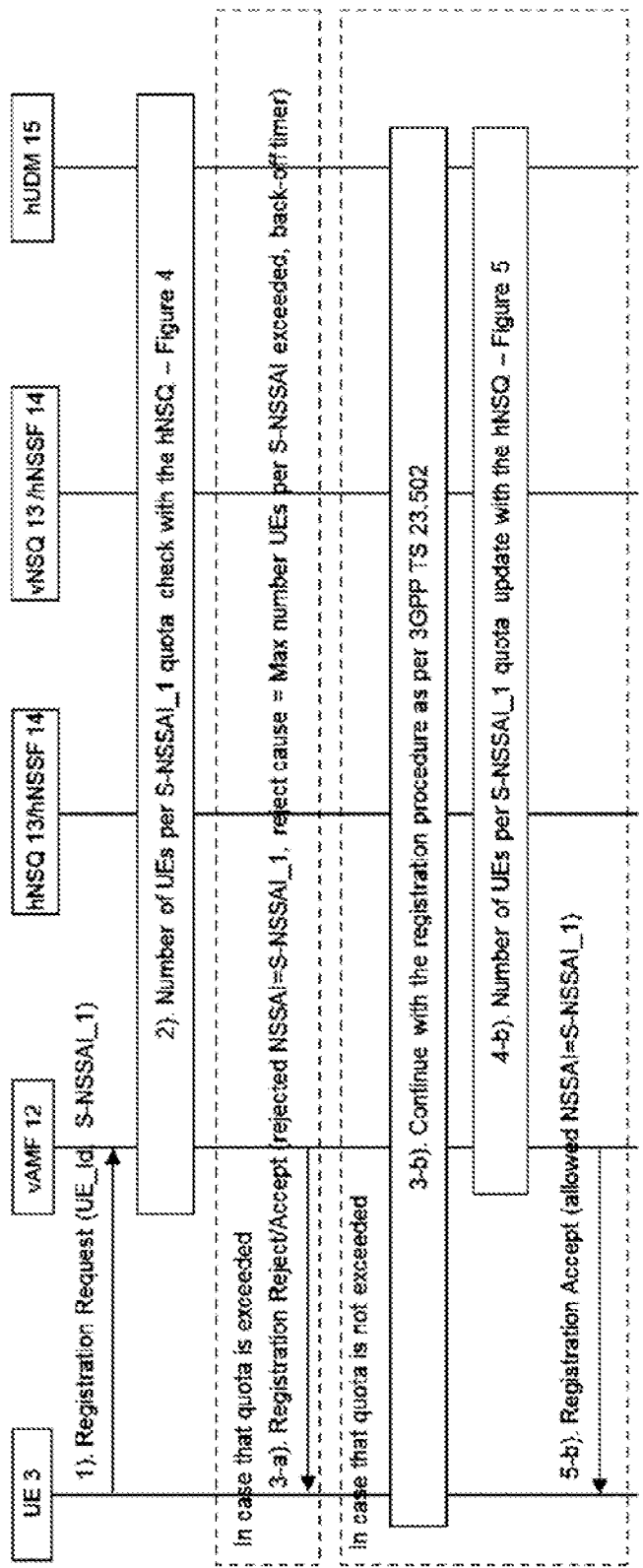
FIG. 3 illustrates schematically an exemplary procedure for UEs per Network Slice quota management and enforcement in the hPLMN.

FIG. 3 illustrates schematically an exemplary procedure for UEs per Network Slice quota management and enforcement in the hPLMN. The global quota is made available in the hPLMN by the OAM 17 or the Service provider (e.g. AF). In roaming, the quota is managed and enforced by the hNSQ 13 of the hPLMN.

- step 1). The UE 3 in roaming requests registration for the S-NSSAI_1 by sending the registration request including the S-NSSAI_1. Although the example demonstrated with this figure is for the S-NSSAI_1, the procedure is equally valid when registering for more than one network slice.
- step 2). The vAMF 12 checks for the "number of UEs per S-NSSAI_1" quota availability with the hNSQ 13/hNSSF 14 in FIG. 4.
- step 3-a). If the "number of UEs per S-NSSAI_1" quota is exceeded, i.e. no quota is available for the S-NSSAI_1 and the S-NSSAI_1 is the only network slice the UE 3 asks to register for, the vAMF 12 sends the registration reject message or the registration accept message with the S-NSSAI_1 in the rejected NSSAI parameter. The vAMF 12 may also include a back-off timer for the S-NSSAI_1 in the registration reject message or the registration accept message. The vAMF 12 may also include a cause value "Quota exceeded" for the S-NSSAI_1 in the registration reject message or the registration accept message. When the UE 3 receives the back-off timer and the cause value "Quota exceeded" for the S-NSSAI_1, the UE shall not attempt to register to the S-NSSAI_1 before the back-off timer expires.
- step 3-b). If the "number of UEs per S-NSSAI_1" quota has not been reached yet, the registration procedure continues with step 4 to step 19 in subsection 4.2.2.2.2 in 3GPP Technical Specification (TS) 23.502 [3].
- step 4-b). The vAMF 12 updates the "number of UEs per S-NSSAI_1" quota with the hNSQ 13/hNSSF 14 as described in FIG. 5.
- step 5-b). The vAMF 12 sends the registration accept message with the S-NSSAI_1 in the allowed NSSAI parameter.

Figure 4:
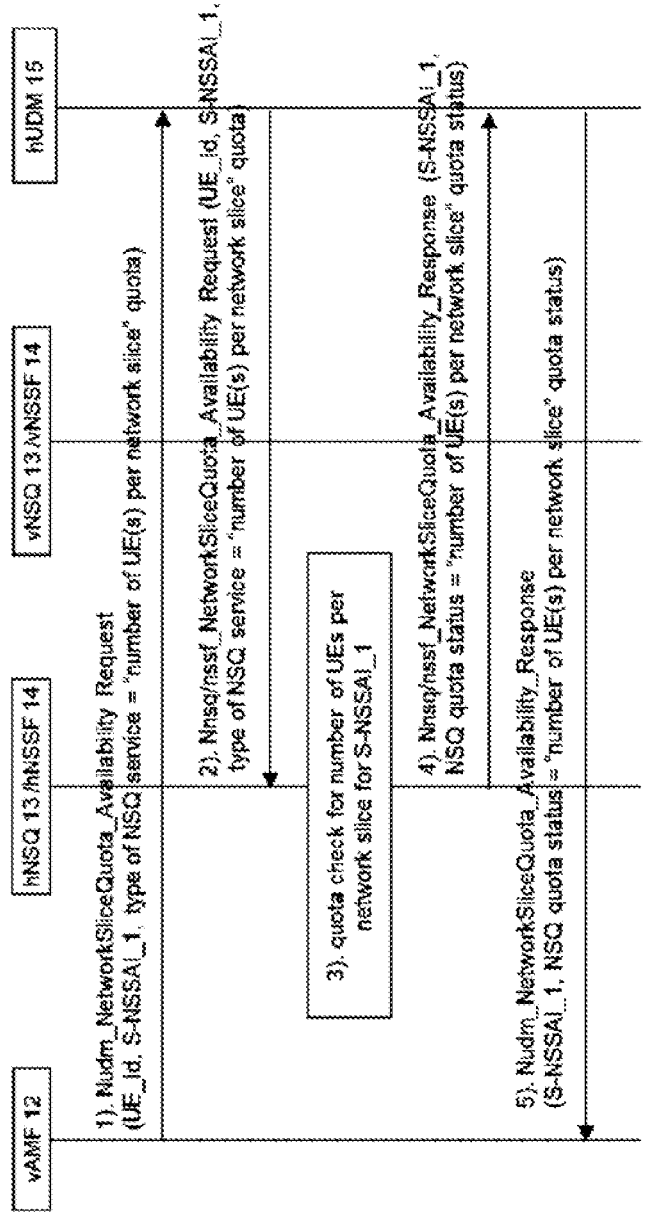
FIG. 4 illustrates schematically an exemplary procedure for "number of UEs per 5-NSSAI_1" quota availability check with the hNSQ/hNSSF in roaming for Model 1.

FIG. 4 illustrates schematically an exemplary procedure for "number of UEs per S-NSSAI_1" quota availability check with the hNSQ 13/hNSSF 14 in roaming for Model 1. The procedure is equally valid for the case of one or more S-NSSAI(s).

- step 1). The vAMF 12 checks for the network slice quota availability with the hNSQ 13/hNSSF 14 in the hPLMN. The vAMF 12 sends the Nudm_NetworkSliceQuota_Availability Request (UE_Id, S-NSSAI_1, type of NSQ service="number of UE(s) per network slice" quota) message to the hUDM 15. The vAMF 12 includes the following parameters: the UE_Id which indicates the UE 3 to be checked whether the UE 3 is subject for NSQ control and restrictions, the S-NSSAI(s)—one or more S-NSSAI for which the quota availability is to be checked, e.g. the S-NSSAI_1; the type of NSQ service whose value is "number of UE(s) per network slice" quota—or any other notation for a flag/parameter which indicates the type of the network slice quota.
- step 2). The hUDM 15 forwards the Nnsq/nssf_NetworkSliceQuota_Availability Request (UE_Id, S-NSSAI_1, type of NSQ service="number of UE(s) per network slice" quota) message to the hNSQ 13/hNSSF 14.
- step 3). The hNSQ 13/hNSSF 14 checks the UEs per network slice quota availability for the S-NSSAI_1. The hNSQ 13/hNSSF 14 either has the global quota available as a number or it has the up-to-date number of UEs per S-NSSAI_1 available and in this case the hNSQ 13/hNSSF 14 compares the current number of UEs per S-NSSAI_1 with the max number of UEs per S-NSSAI_1 quota. In case that the UE_Id is included in the Nnsq/nssf_NetworkSliceQuota_Availability Request message, the NSQ 13/NSSF 14 checks first that the UE_Id has already been previously registered for S-NSSAI_1 (i.e. the UE 3 has already been included in the list of UEs registered with S-NSSAI_1). If the UE_Id is already in the list of UEs registered with S-NSSAI_1, then no further check will be made, i.e. no need for Quota checking. The UE 3 shall not be rejected.
- step 4). The hNSQ 13/hNSSF 14 returns the Nnsq/nssf_NetworkSliceQuota_Availability Response (S-NSSAI_1, NSQ quota status="number of UE(s) per network slice" quota status) message to the hUDM 15.

The "number of UE(s) per network slice" quota status indicates 'no quota available' if the number of UEs per S-NSSAI_1 exceeds the max number of UEs per S-NSSAI_1 quota.

The "number of UE(s) per network slice" quota status indicates 'quota available' if the number of UEs per S-NSSAI_1 does not exceed the max number of UEs per S-NSSAI_1 quota.

- step 5). The hUDM 15 forwards the Nnsq/nssf_NetworkSliceQuota_Availability Response (S-NSSAI_1, NSQ quota status="number of UE(s) per network slice" quota status) message to the vAMF 12.

Note that if the service function as described in step 3) resides in the hUDM 15, then both step 2) and step 4) can be considered as interfaces between service functions within the hUDM 15.

Figure 5:
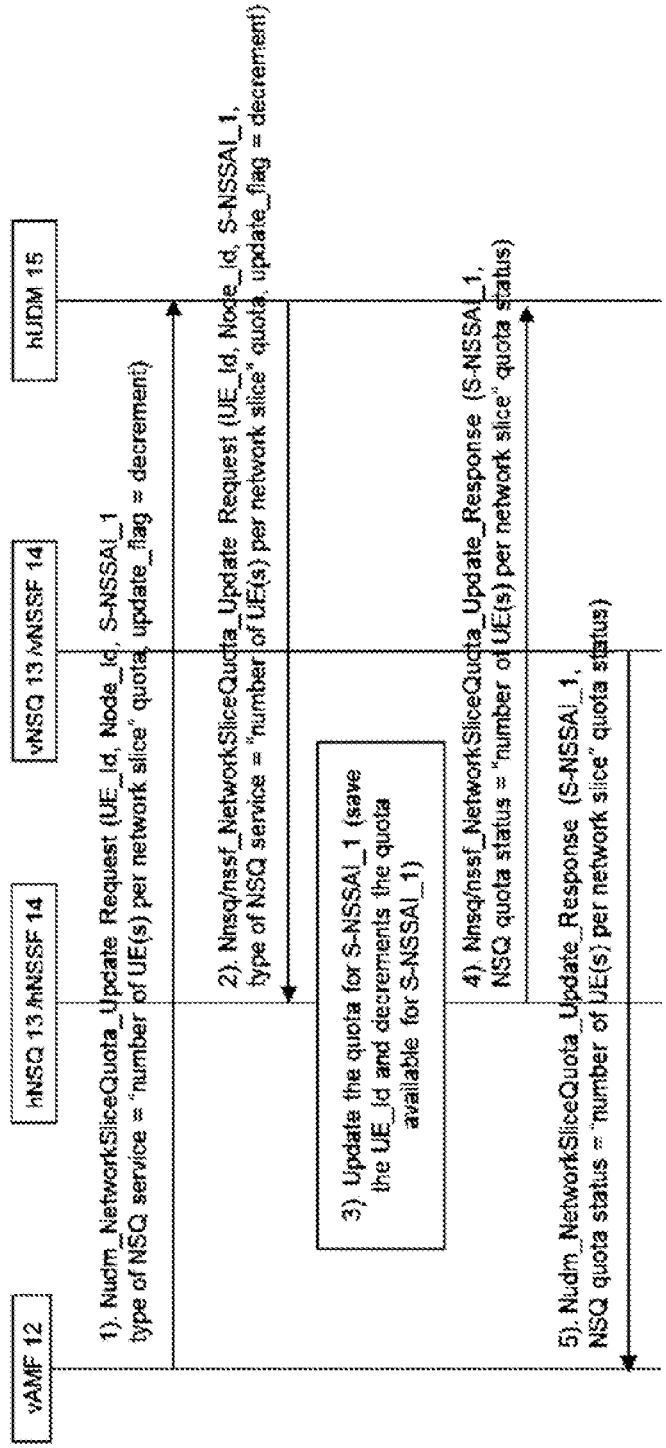
FIG. 5 illustrates schematically an exemplary procedure for "number of UEs per 5-NSSAI_1" quota update with the hNSQ/hNSSF in roaming for Model 1.

FIG. 5 illustrates schematically an exemplary procedure for "number of UEs per S-NSSAI_1" quota update with the hNSQ 13/hNSSF 14 in roaming for Model 1. The procedure is equally valid for the case of one or more S-NSSAI(s).

- step 1). The vAMF 12 updates the network slice quota with the hNSQ 13/hNSSF 14 of the hPLMN. The AMF 12 sends the Nudm_NetworkSliceQuota_Update Request (UE_Id, Node_Id, S-NSSAI_1, type of NSQ service="number of UE(s) per network slice" quota, update flag="decrement") message to the hUDM 15. The vAMF 12 includes the following parameters: the UE_Id, Node_Id, the S-NSSAI(s)—one or more S-NSSAI for which the registration is ongoing in roaming, e.g. the S-NSSAI_1; the type of NSQ service whose value is "number of UE(s) per network slice" quota to indicate the type of the quota to be updated and an update_flag whose value is "decrement" to indicate for the quota for the S-NSSAI_1 to be decremented as a new UE is being registered for the S-NSSAI_1.
- step 2). The hUDM 15 forwards the Nnsq/nssf_NetworkSliceQuota_Update Request (UE_Id, Node_Id, S-NSSAI_1, type of NSQ service="number of UE(s) per network slice" quota, update flag="decrement") message to the hNSQ 13/hNSSF 14 or any other network entity with which the network slice quota functionality may be co-located in the hPLMN, e.g. hNSSF, hPCF, hNWDAF.
- step 3). The hNSQ 13/hNSSF 14 updates the list of UEs in the S-NSSAI_1 by adding the UE_Id to the list of UEs registered for the NSSAI_1 and decrements the quota available to the S-NSSAI_1. Alternatively, instead decrementing the available quota for the S-NSSAI_1, the hNSQ 13/hNSSF 14 may instead increase the number of UEs registered with the S-NSSAI_1 which can later be compared with the max number of UEs allowed for that S-NSSAI_1 for deciding whether a quota for S-NSSAI_1 is available or not. Note that "the quota to be decremented" means that the rest of quota to be decremented, i.e. the number of registered UEs for the quota to be incremented. In case there is a Node_Id but no UE_Id(s) and the update_flag is set to "decrement" in the Nnsq/nssf_NetworkSlice-Quota_Update Request message, the NSQ 13/NSSF 14 decrements the number of registered UE(s) in the NSQ 13/NSSF 14 which are associated with the Node_Id.

step 4). The hNSQ 13/hNSSF 14 returns the Nnsq/nssf_NetworkSliceQuota_Update Response (S-NSSAI_1, NSQ quota status="number of UE(s) per network slice" quota status) message to the hUDM 15 in which the hNSQ 13/hNSSF 14 includes the remaining quota for the S-NSSAI_1. Alternatively the hNSQ 13/hNSSF 14 may indicate the current number of UEs registered for the S-NSSAI_1.

step 5). The hUDM 15 forwards the Nudm_NetworkSliceQuota_Update Response (S-NSSAI_1, NSQ quota status="number of UE(s) per network slice" quota status) message to the vAMF 12.

Note that if the service function as described in step 3) resides in the hUDM 15, then both step 2) and step 4) can be considered as interfaces between service functions within the hUDM 15.

Model 2

Figure 6:
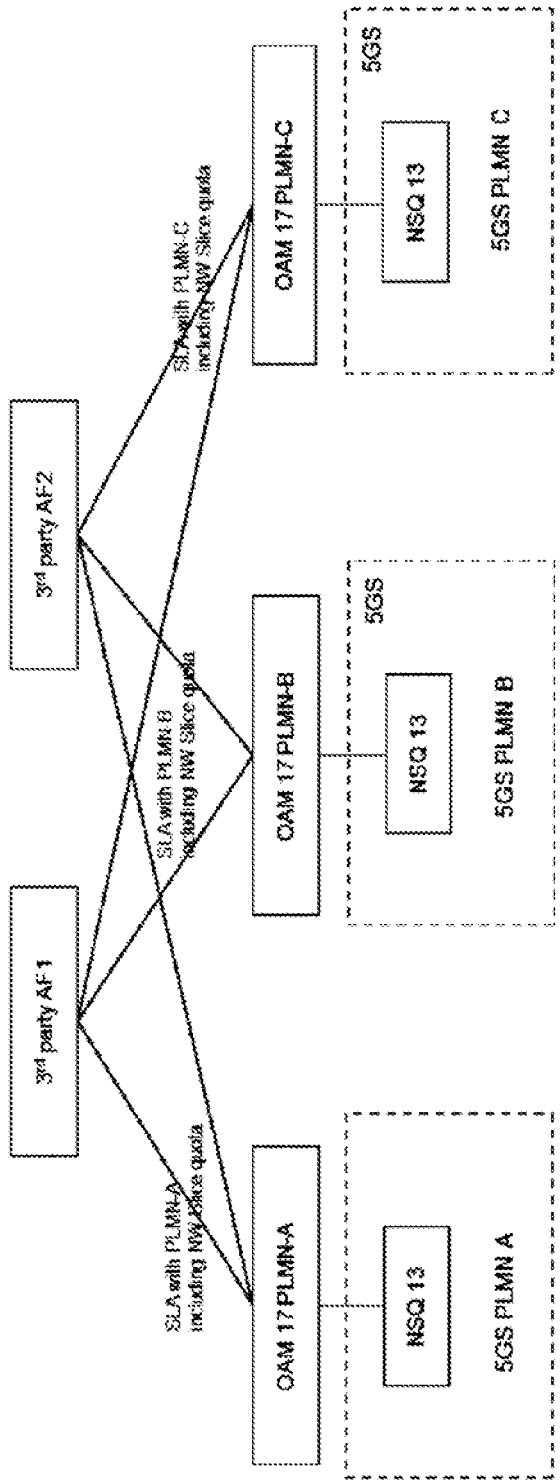
FIG. 6 illustrates schematically an exemplary architecture for Network Slice Quota management during roaming by the visiting PLMN (vPLMN).

FIG. 6 illustrates schematically an exemplary architecture for Network Slice Quota management during roaming by the visiting PLMN (vPLMN), i.e. the visiting Network Slice Quota (vNSQ) function which can be a new functional entity implemented as a new network node or a functional entity within any existing network node (e.g. vNSSF, vAMF, vPCF, vNWDAF). Third party AFs have associations with the OAM system in each PLMN (i.e. home and visiting). The home quota is counted in hPLMN, i.e. the roaming quota is counted in the vPLMN. The global quota is counted in the AF by querying to all associated NSQs in both hPLMN and vPLMNs.

FIG. 7 to FIG. 11 illustrate in more detail UEs per network slice quota management and enforcement in the vPLMN. The Service Provider (e.g. AF) allocates quota for each vPLMN(s) including the hPLMN. The global quota is updated in the AF by interrogating to the associated NSQs in each PLMNs.

UE Registration

Figure 7:
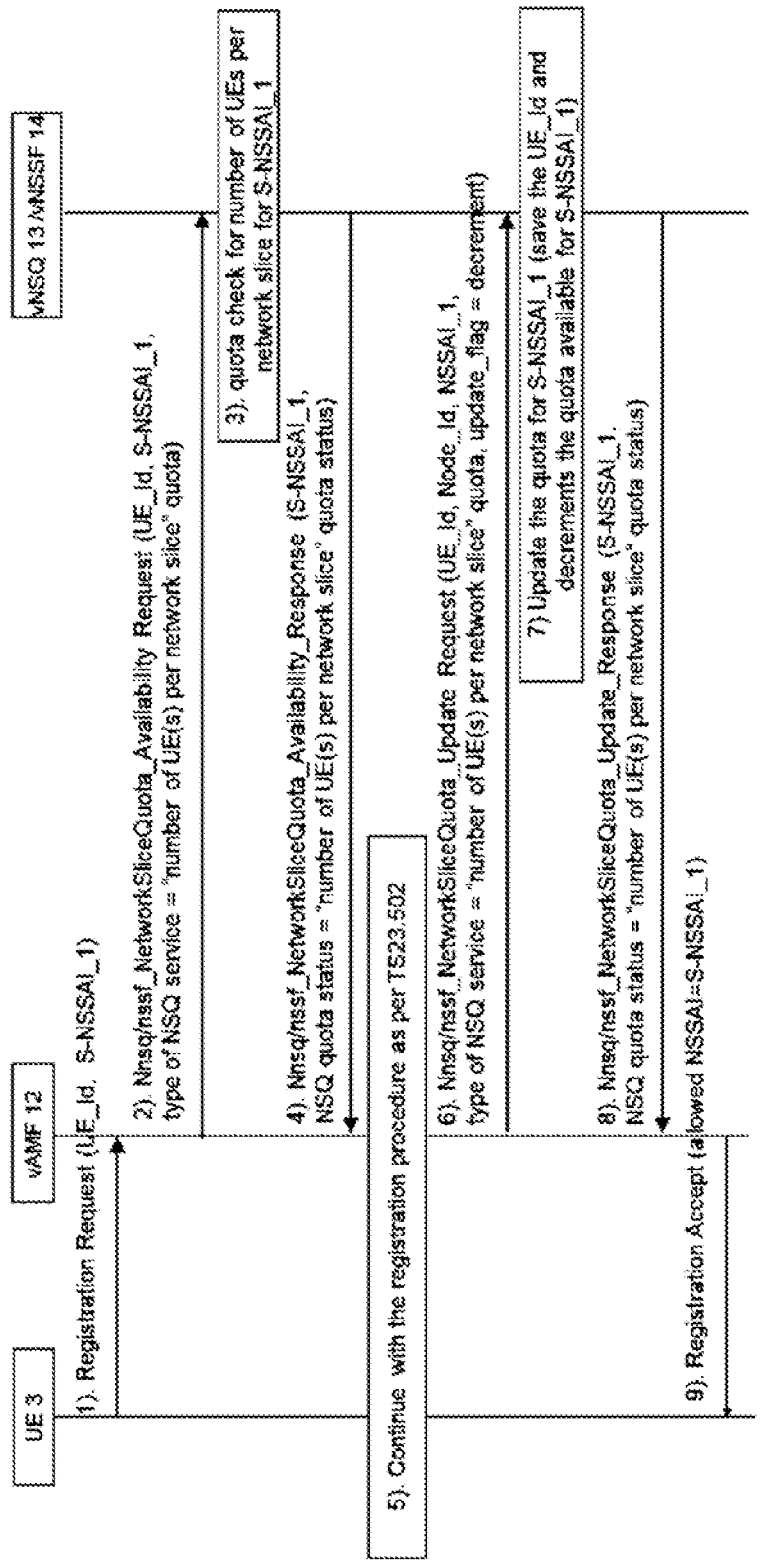
FIG. 7 illustrates schematically an exemplary procedure for Number of UEs per network slice quota update with the vNSQ/vNSSF in roaming (Model 2).

FIG. 7 illustrates schematically an exemplary procedure for Number of UEs per network slice quota update with the vNSQ 13/vNSSF 14 in roaming (Model 2), in which:

step 1). The UE 3 in roaming requests registration for the S-NSSAI_1 by sending the registration request including the S-NSSAI_1. Although the example demonstrated with this figure is for the S-NSSAI_1, the procedure is equally valid when registering for more than one network slice.

step 2). The vAMF 12 checks for the network slice quota availability. The vAMF 12 sends the Nnsq/nssf_NetworkSliceQuota_Availability Request (UE_Id, S-NSSAI_1, type of NSQ service="number of UE(s) per network slice" quota) message to the visited Network Slice Quota (vNSQ) or any other network entity with which the network slice quota functionality may be co-located, e.g. vNSSF, vPCF, vNWDAF. The vAMF 13 includes the following parameters: the UE_Id which indicates the UE to be checked whether the UE 3 is subject for NSQ control and restrictions; the S-NSSAI(s)—one or more S-NSSAI(s) for which the registration is ongoing, e.g. the S-NSSAI_1; the type of NSQ service whose value is "number of UE(s) per network slice" quota—or any other notation for a flag/parameter which indicates the type of the network slice quota.

step 3). The vNSQ 13/vNSSF 14 checks the UEs per network slice quota availability for the S-NSSAI_1. The hNSQ 13/hNSSF 14 either has the roaming quota available as a number or it has available the up-to-date number of the roaming UEs per S-NSSAI_1 and in this case the hNSQ 13/hNSSF 14 compares the current number of roaming UEs per S-NSSAI_1 with the max number of roaming UEs per S-NSSAI_1 quota that has been allocated to that vPLMN by the AF 16. In case that a UE_Id is included in the Nnsq/nssf_NetworkSliceQuota_Availability Request message, the NSQ 13/NSSF 14 checks first that the UE_Id has already been included in the list of UEs for the 5-NSSAI_1. If the UE_Id has already been registered (i.e. it is in the list of UEs registered with S-NSSAI_1), then no further check will be made, i.e. no need for Quota checking. The UE 3 shall not be rejected.

step 4). The vNSQ 13/vNSSF 14 returns the Nnsq/nssf_NetworkSliceQuota_Availability Response (S-NSSAI_1, NSQ quota status="number of UE(s) per network slice" quota status) message to the vAMF 12.

The "number of UE(s) per network slice" quota status indicates 'no quota available' if the number of UEs per S-NSSAI_1 exceeds the max number of UEs per S-NSSAI_1 quota. The "number of UE(s) per network slice" quota status indicates 'quota available' if the number of UEs per S-NSSAI_1 does not exceed the max number of UEs per S-NSSAI_1 quota.

step 5). If the max number of UEs per S-NSSAI_1 quota is exceeded, i.e. no quota is available for the S-NSSAI_1 and the S-NSSAI_1 is the only network slice the UE 3 asks to register for, the vAMF 12 rejects the registration and returns the S-NSSAI_1 in the rejected NSSAI list parameter. The vAMF 12 may also return a back-off timer for the S-NSSAI_1. If the max number of UEs per S-NSSAI_1 quota has not been reached yet, the procedure continues with the next step.

step 6). The vAMF 12 updates the network slice quota with the vNSQ 13/vNSSF 14 of the vPLMN. The vAMF 12 sends the Nnsq/nssf_NetworkSliceQuota_Update Request (UE_Id, Node_Id, S-NSSAI_1, type of NSQ service="number of UE(s) per network slice" quota, update flag="decrement") message to the vNSQ 13/vNSSF 14. The vAMF 12 includes the following parameters: the UE_Id, the S-NSSAI(s)—one or more S-NSSAI for which the registration is ongoing in roaming, e.g. the S-NSSAI_1; the type of NSQ service whose value is "number of UE(s) per network slice" quota to indicate the type of the quota to be updated and an update_flag whose value is "decrement" to indicate for the quota for the S-NSSAI_1 to be decremented as a new UE is being registered for the S-NSSAI_1.

step 7). The vNSQ 13/vNSSF 14 updates the list of UEs in the S-NSSAI_1 by adding the UE_Id to the list of UEs registered for the NSSAI_1 and decrements the quota available to the S-NSSAI_1. Alternatively, instead decrementing the available quota for the S-NSSAI_1, the vNSQ 13/vNSSF 14 may instead increase the number of UEs registered with the S-NSSAI_1 which can later be compared with the max number of UEs allowed for that S-NSSAI_1 for deciding whether a quota for the S-NSSAI_1 is available or not. Note that "the quota to be decremented" means that the rest of quota to be decremented. I.e. the number of registered UEs for the quota to be incremented.

In case there is a Node_Id but no UE_Id(s) and the update_flag is set to "decrement" in the Nnsq/nssf_NetworkSliceQuota_Update Request message, the NSQ/NSSF decrements the number of registered UE(s) in the NSQ 13/NSSF 14 which are associated with the Node_Id.

step 8). The vNSQ 13/vNSSF 14 returns the Nnsq/nssf_NetworkSliceQuota_Update Response (S-NSSAI_1, NSQ quota status="number of UE(s) per network slice" quota status) message to the vAMF 12.

step 9). The vAMF 12 sends the registration accept message with the S-NSSAI_1 in the allowed NSSAI parameter.

Subscribe/Unsubscribe to the NSQ

Figure 8:
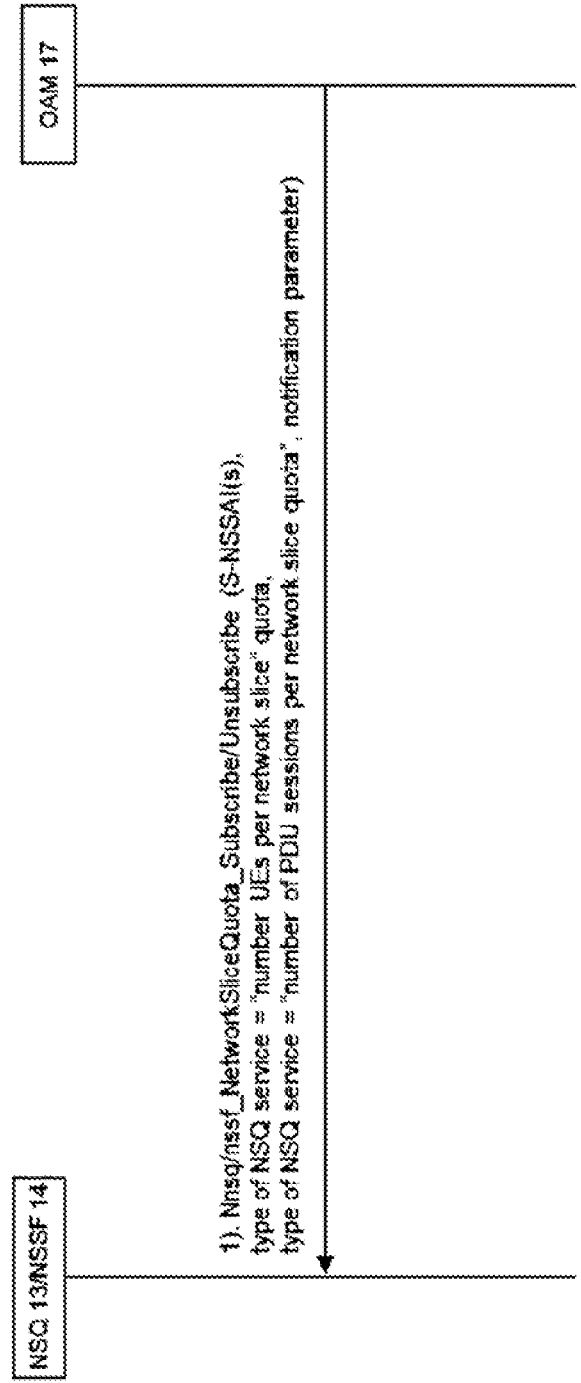
FIG. 8 illustrates schematically an exemplary procedure for Network Slice Quota Subscribe/Unsubscribe to the NSQ (Model 2).

FIG. 8 illustrates schematically an exemplary procedure for Network Slice Quota Subscribe/Unsubscribe to the NSQ 13 (Model 2), in which:

step 1). The OAM 17 sends the Nnsq/nssf_NetworkSliceQuota_Subscribe/Unsubscribe (S-NSSAI(s), type of NSQ service="number UEs per network slice" quota, type of NSQ service="number of PDU sessions per network slice" quota) to the NSQ 13, a new parameter "notification parameter" for indicating the triggers for the Notification, for example, periodic notification, threshold based notification, and event based notification and etc., can be included as parameters.

Network Slice Quota Availability Check

Figure 9:
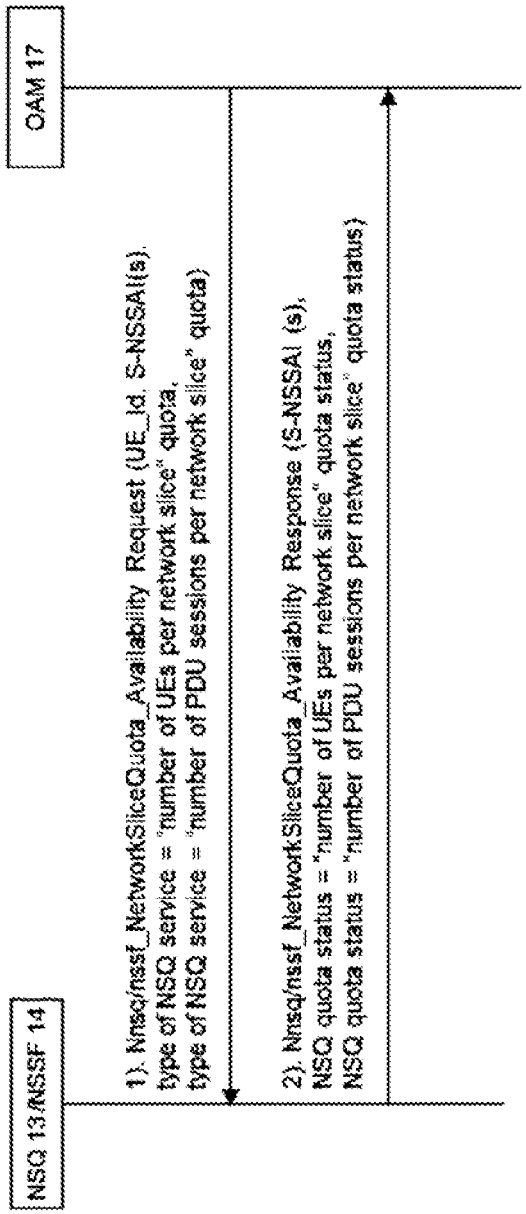
FIG. 9 illustrates schematically an exemplary procedure for Network Slice Quota Availability check to the NSQ (Model 2).

FIG. 9 illustrates schematically an exemplary procedure for Network Slice Quota Availability check to the NSQ 13 (Model 2), in which:

step 1). The OAM 17 sends the Nnsq/nssf_NetworkSliceQuota_Availability Request (UE_Id, S-NSSAI(s), type of NSQ service="number of UEs per network slice" quota, type of NSQ service="number of PDU sessions per network slice" quota)—the OAM 17 sends a request to the NSQ 13/NSSF 14 for network slice quota availability check, e.g. number of UEs per network slice quota availability. The AF 16 includes as a parameter S-NSSAI(s) for which the AF 16 wishes to check the quota availability e.g. the 5-NSSAI_1 and the type of NSQ service, e.g. "number of UEs per network slice" quota.

step 2). The NSQ 13/NSSF 14 responds to the OAM 17 with the Nnsq/nssf_NetworkSliceQuota_Availability Response (S-NSSAI(s), NSQ quota status="number of UEs per network slice" quota status, NSQ quota status="number of PDU sessions per network slice" quota status) message. The NSQ 13/NSSF 14 includes as a parameter S-NSSAI(s) for which the reported quota is applicable, e.g. the S-NSSAI_1 along with the available quota, e.g. "number of UEs per network slice" quota status (NSQ quota status).

Network Slice Quota Update

Figure 10:
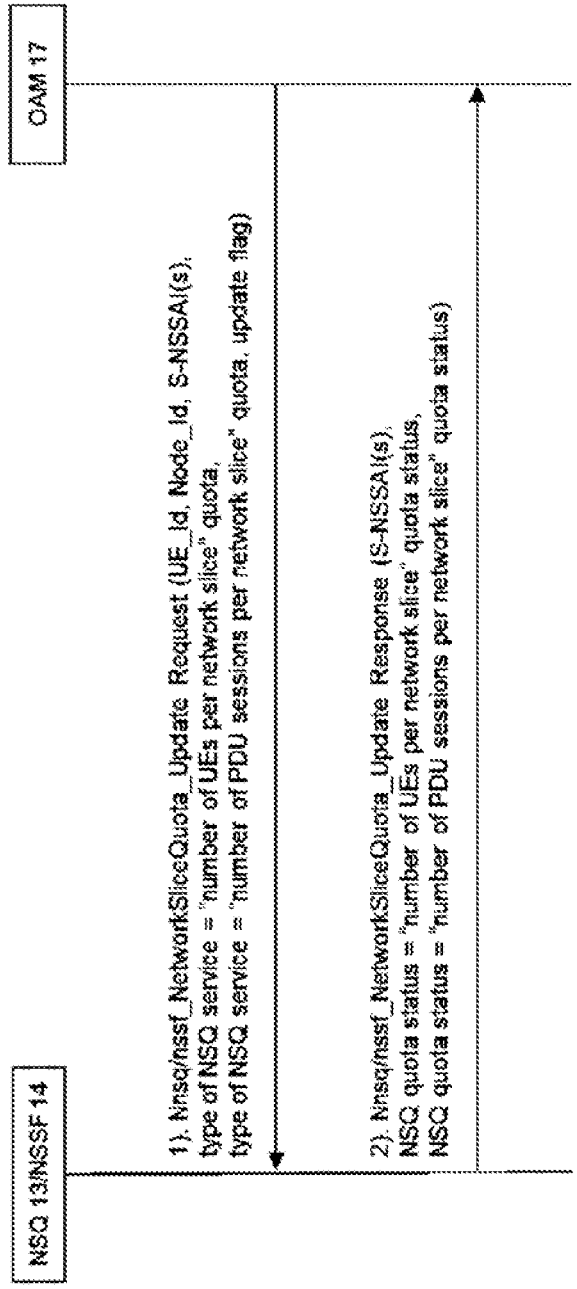
FIG. 10 illustrates schematically an exemplary procedure for Network Slice Quota update to the NSQ (Model 2).

FIG. 10 illustrates schematically an exemplary procedure for Network Slice Quota update to the NSQ 13 (Model 2), in which:

step 1). The OAM 17 sends the Nnsq/nssf_NetworkSliceQuota_Update Request (UE_Id, S-NSSAI(s), type of NSQ service="number of UEs per network slice" quota, type of NSQ service="number of PDU sessions per network slice" quota, update_flag)–the OAM 17 sends a request to the NSQ 13/NSSF 14 for network slice quota update, e.g. number of UEs per network slice quota update. The OAM 17 includes as a parameter UE_Id, S-NSSAI(s) for which the OAM 17 wishes to update the quota, e.g. the S-NSSAI_1, the type of NSQ service, e.g. number of UEs per network slice quota and the update flag which is to indicate whether the quota shall be incremented or decremented.

step 2). The NSQ 13/NSSF 14 responds to the OAM 17 with the Nnsq/nssf_NetworkSliceQuota_Update Response (S-NSSAI(s), NSQ quota status="number of UEs per network slice" quota status, NSQ quota status="number of PDU sessions per network slice" quota status) message. The NSQ 13/NSSF 14 includes as a parameter S-NSSAI(s) for which the reported quota status is applicable, e.g. the S-NSSAI_1 along with the available quota, e.g. number of UEs per network slice quota status (NSQ quota status).

Network Slice Quota Notify

Figure 11:
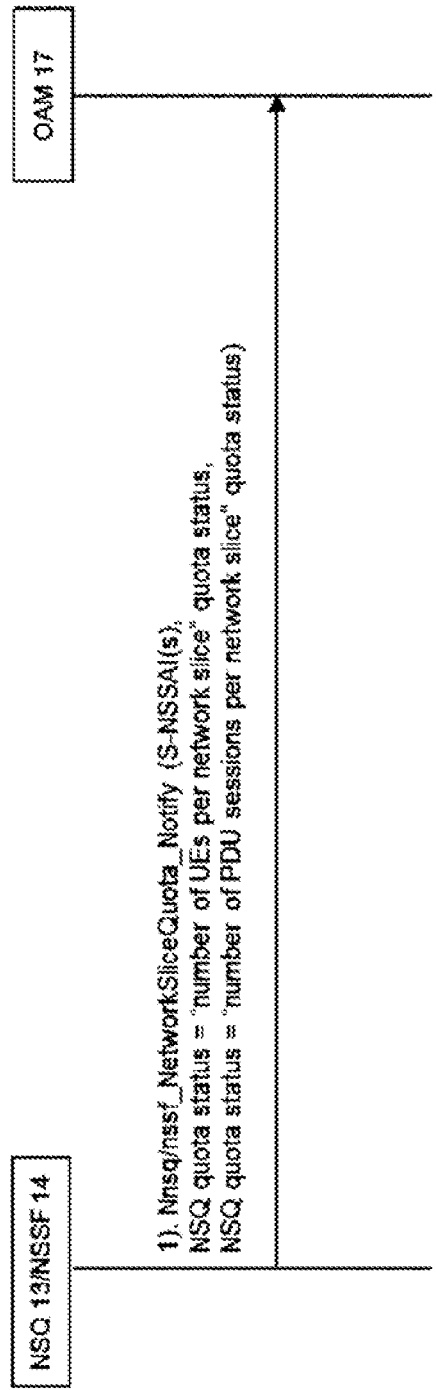
FIG. 11 illustrates schematically an exemplary procedure for Network Slice Quota notify to the OAM (Model 2).

FIG. 11 illustrates schematically an exemplary procedure for Network Slice Quota notify to the OAM 17 (Model 2), in which:

step 1). Nnsq/nssf_NetworkSliceQuota_Notify (S-NSSAI(s), NSQ quota status="number of UEs per network slice" quota status, NSQ quota status="number of PDU sessions per network slice" quota status)—The NSQ 13/NSSF 14 sends a notification about the network slice quota status (NSQ quota status). The NSQ 13/NSSF 14 includes as a parameter S-NSSAI(s) for which the reported quota status is applicable, e.g. the S-NSSAI_1 along with the available quota, e.g. "number of UEs per network slice" quota status (NSQ quota status). The notification could be triggered periodically or triggered by an event or threshold based on the notification subscription by the OAM 17.

Model 3

Figure 12:
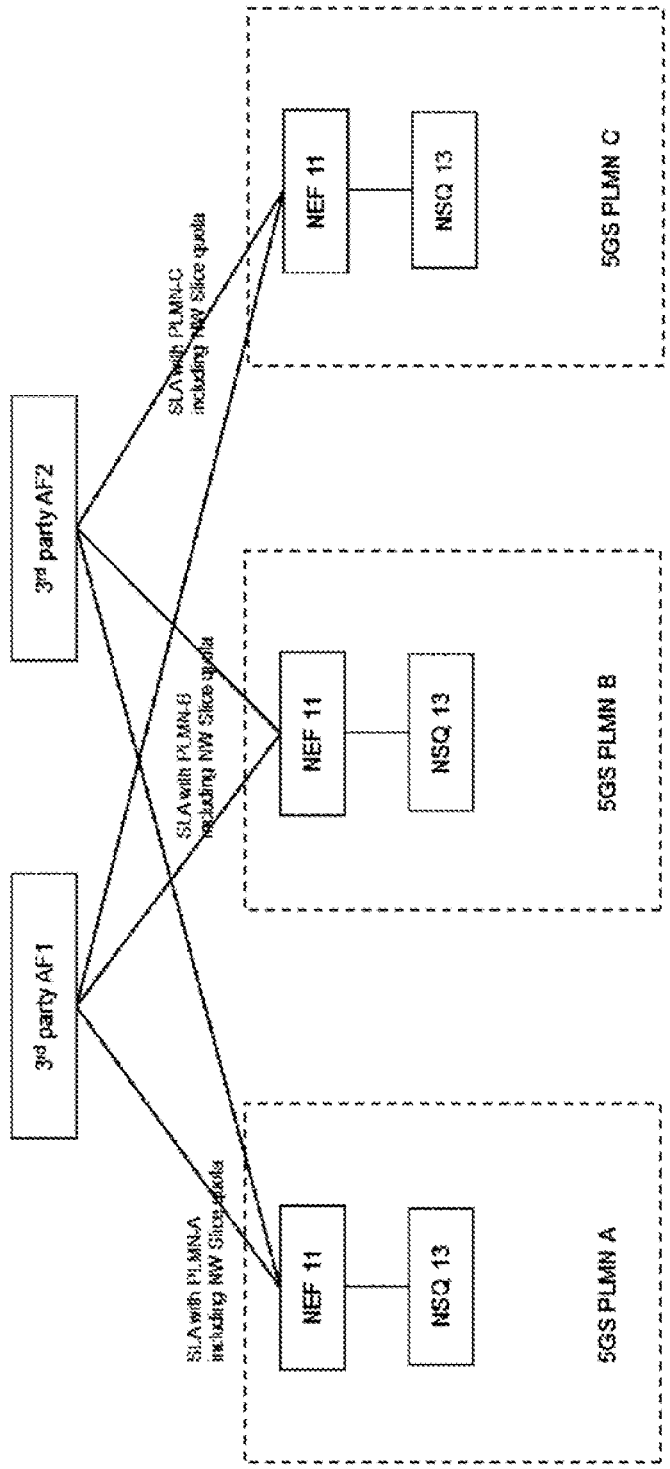
FIG. 12 illustrates schematically an exemplary architecture for Network Slice Quota management during roaming by the AF via the NEF.

FIG. 12 illustrates schematically an exemplary architecture for Network Slice Quota management during roaming by the AF 16 via the NEF 11. Third party AFs (e.g. AF1 and AF2) have respective associations with the NSQ 13 in each PLMN via the NEF 11. The global quota is counted by the AF 16 via interworking with the NEF 11 in each PLMN.

FIG. 13 to FIG. 17 illustrate in detail UEs per network slice quota management and enforcement in the vPLMN. The Service Provider (e.g. AF) allocates quota for each vPLMN(s) including the hPLMN. The global quota is updated in the AF 16 by interrogating to the associated NSQs 13 via the NEF 11 in each PLMNs.

UE Registration

Figure 13:
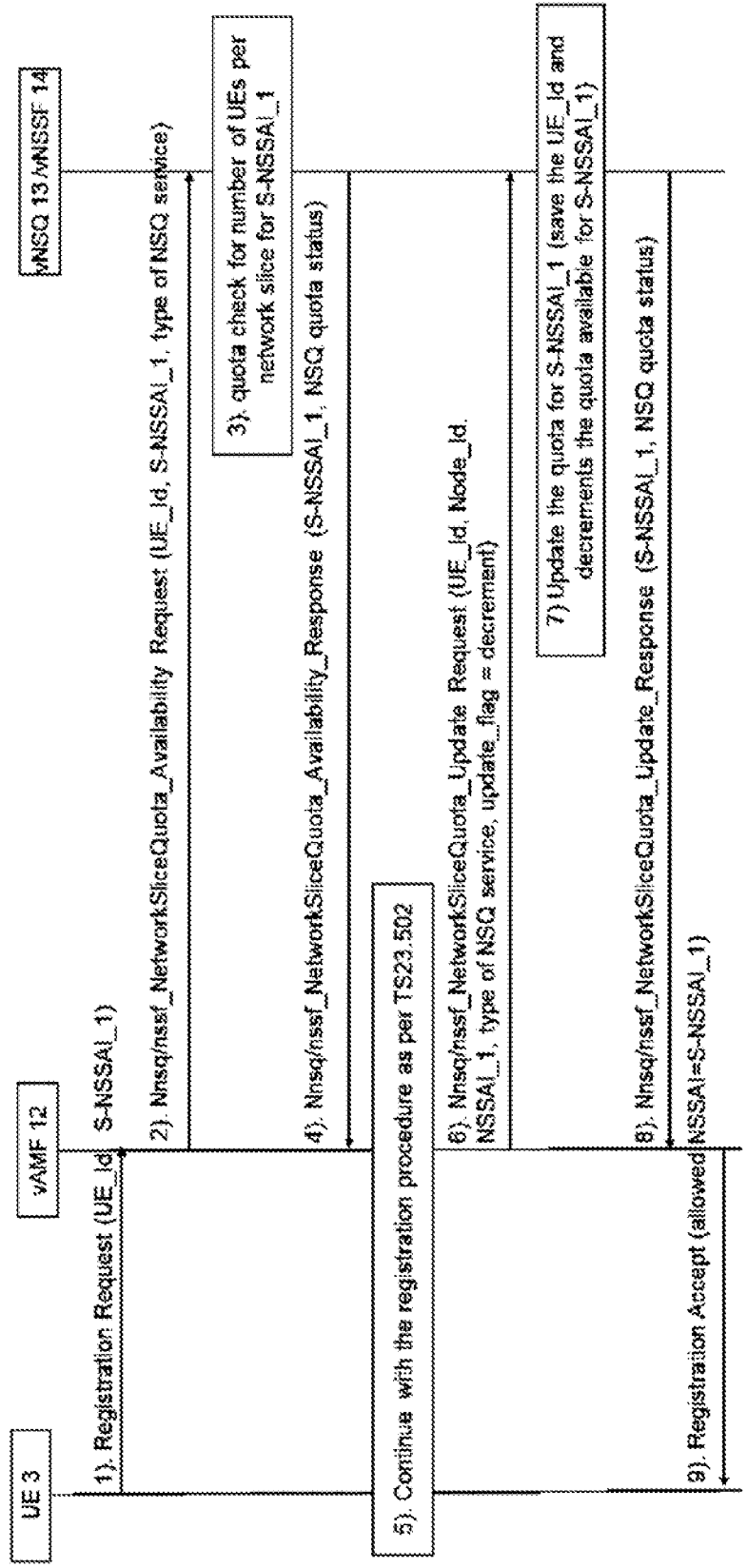
FIG. 13 illustrates schematically an exemplary procedure for Number of UEs per network slice quota update with the vNSQ/vNSSF in roaming (Model 3).

FIG. 13 illustrates schematically an exemplary procedure for Number of UEs per network slice quota update with the vNSQ 13/vNSSF 14 in roaming (Model 3), in which:

step 1). The UE 3 in roaming requests registration for the S-NSSAI_1 by sending the registration request including the S-NSSAI_1. Although the example demonstrated with this figure is for the S-NSSAI_1, the procedure is equally valid when registering for more than one network slice.

step 2). The vAMF 12 checks for the network slice quota availability. The vAMF 12 sends the Nnsq/nssf_NetworkSliceQuota_Availability Request (UE_Id, S-NSSAI_1, type of NSQ service="number of UE(s) per network slice" quota) message to the visited Network Slice Quota (vNSQ 13) or any other network entity with which the network slice quota functionality may be co-located, e.g. vNSSF 14, vPCF, vNWDAF. The vAMF 12 includes the following parameters: the UE_Id which indicates the UE 3 to be checked whether the UE 3 is subject for NSQ control and restrictions; the S-NSSAI(s)—one or more S-NSSAI(s) for which the registration is ongoing, e.g. the S-NSSAI_1; the type of NSQ service whose value is "number of UE(s) per network slice" quota—or any other notation for a flag/parameter which indicates the type of the network slice quota.

step 3). The vNSQ 13/vNSSF 14 checks the UEs per network slice quota availability for the S-NSSAI_1. The hNSQ 13/hNSSF 14 either has the roaming quota available as a number or it has available the up-to-date number of the roaming UEs per S-NSSAI_1 and in this case the hNSQ 13/hNSSF 14 compares the current number of roaming UEs per S-NSSAI_1 with the max number of roaming UEs per S-NSSAI_1 quota that has been allocated to that vPLMN by the AF 16. In case that a UE_Id is included in the Nnsq/nssf_NetworkSlice-Quota_Availability Request message, the NSQ/NSSF checks first that the UE_Id has already been included in the list of UEs for the S-NSSAI_1. If the UE_Id has already been registered (i.e. it is in the list of UEs registered with 5-NSSAI_1), then no further check will be made, i.e. no need for Quota checking. The UE 3 shall not be rejected.

step 4). The vNSQ 13/vNSSF 14 returns the Nnsq/nssf_NetworkSliceQuota_Availability Response (S-NSSAI_1, NSQ quota status="number of UE(s) per network slice" quota status) message to the vAMF 12.

The "number of UE(s) per network slice" quota status indicates 'no quota available' if the number of UEs per S-NSSAI_1 exceeds the max number of UEs per S-NSSAI_1 quota. The "number of UE(s) per network slice" quota status indicates 'quota available' if the number of UEs per S-NSSAI_1 does not exceed the max number of UEs per S-NSSAI_1 quota.

step 5). If the max number of UEs per S-NSSAI_1 quota is exceeded, i.e. no quota is available for the S-NSSAI_1 and the S-NSSAI_1 is the only network slice the UE 3 asks to register for, the vAMF 12 rejects the registration and returns the S-NSSAI_1 in the rejected NSSAI list parameter. The vAMF 12 may also return a back-off timer for the S-NSSAI_1. If the max number of UEs per S-NSSAI_1 quota has not been reached yet, the procedure continues with the next step.

step 6). The vAMF 12 updates the network slice quota with the vNSQ 13/vNSSF 14 of the vPLMN. The AMF 12 sends the Nnsq/nssf_NetworkSliceQuota_Update Request (UE_Id, Node_Id, S-NSSAI_1, type of NSQ service="number of UE(s) per network slice" quota, update flag="decrement") message to the vNSQ 13/vNSSF 14. The vAMF 12 includes the following parameters: the UE_Id, the S-NSSAI(s)—one or more S-NSSAI for which the registration is ongoing in roaming, e.g. the S-NSSAI_1; the type of NSQ service whose value is "number of UE(s) per network slice" quota to indicate the type of the quota to be updated and an update_flag whose value is "decrement" to indicate for the quota for the S-NSSAI_1 to be decremented as a new UE is being registered for the S-NSSAI_1.

step 7). The vNSQ 13/vNSSF 14 updates the list of UEs in the S-NSSAI_1 by adding the UE_Id to the list of UEs registered for the NSSAI_1 and decrements the quota available to the S-NSSAI_1. Alternatively, instead decrementing the available quota for the S-NSSAI_1, the vNSQ 13/vNSSF 14 may instead increase the number of UEs registered with the S-NSSAI_1 which can later be compared with the max number of UEs allowed for that S-NSSAI_1 for deciding whether a quota for the S-NSSAI_1 is available or not. Note that "the quota to be decremented" means that the rest of quota to be decremented. I.e. the number of registered UEs for the quota to be incremented.

In case there is a Node_Id but no UE_Id(s) and the update_flag is set to "decrement" in the Nnsq/nssf_NetworkSliceQuota_Update Request message, the NSQ 13/NSSF 14 decrements the number of registered UE(s) in the NSQ 13/NSSF 14 which are associated with the Node_Id.

step 8). The vNSQ 13/vNSSF 14 returns the Nnsq/nssf_NetworkSliceQuota_Update Response (S-NSSAI_1, NSQ quota status="number of UE(s) per network slice" quota status) message to the vAMF 12.

step 9). The vAMF 12 sends the registration accept message with the S-NSSAI_1 in the allowed NSSAI parameter.

Subscribe/Unsubscribe to the NSQ

Figure 14:
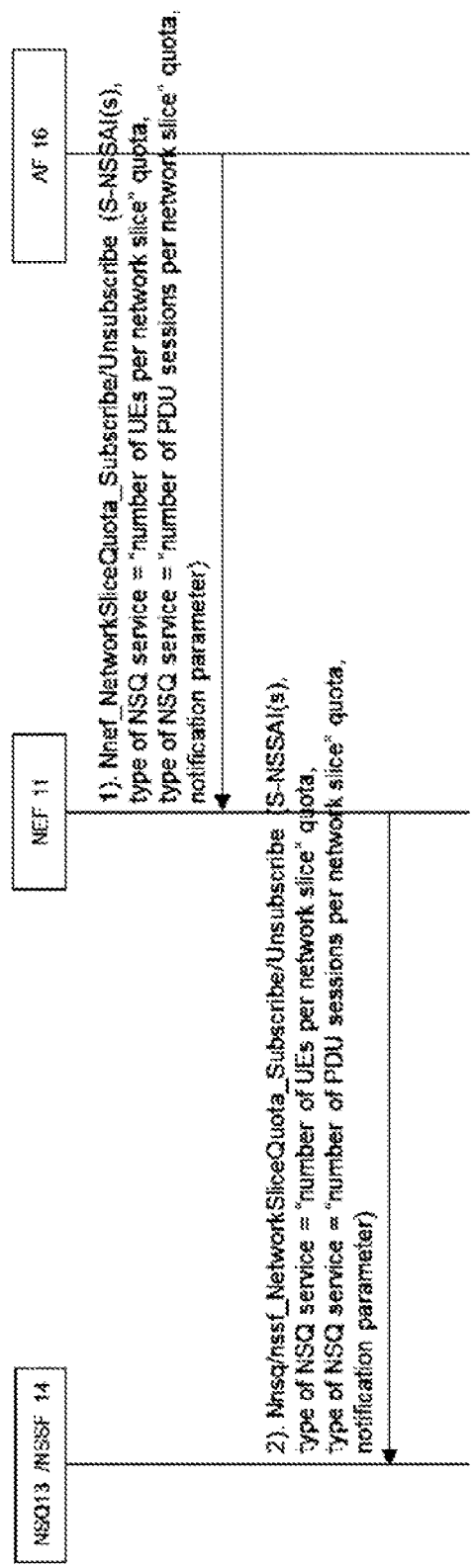
FIG. 14 illustrates schematically an exemplary procedure for Network Slice Quota information subscription by the AF via the NEF (Model 3).

FIG. 14 illustrates schematically an exemplary procedure for Network Slice Quota information subscription by the AF 16 via the NEF 11 (Model 3), in which:

step 1). Nnef_NetworkSliceQuota_Subscribe/Unsubscribe (S-NSSAI(s), type of NSQ service="number of UEs per network slice" quota, type of NSQ service="number of PDU sessions per network slice" quota)—the AF 16 sends a request to the NEF 11 for subscription/unsubscription for network slice quota services, e.g. number of UEs per network slice quota management. The AF 16 includes as a parameter S-NSSAI(s) for which the AF 16 wishes to subscribe or unsubscribe for NSQ services, e.g. the S-NSSAI_1; and the type of NSQ service, e.g. "number of UEs per network slice" quota; a new parameter "notification parameter" for indicating the triggers for the Notification, for example, periodic notification, threshold based notification, and event based notification and etc., can be included as parameters.

step 2). Nnsq/nssf_NetworkSliceQuota_Subscribe/Unsubscribe (S-NSSAI(s), type of NSQ service="number UEs per network slice" quota, type of NSQ service="number of PDU sessions per network slice" quota)—The NEF 11 forwards the request to the NSQ 13/NSSF 14.

Network Slice Quota Availability Check

Figure 15:
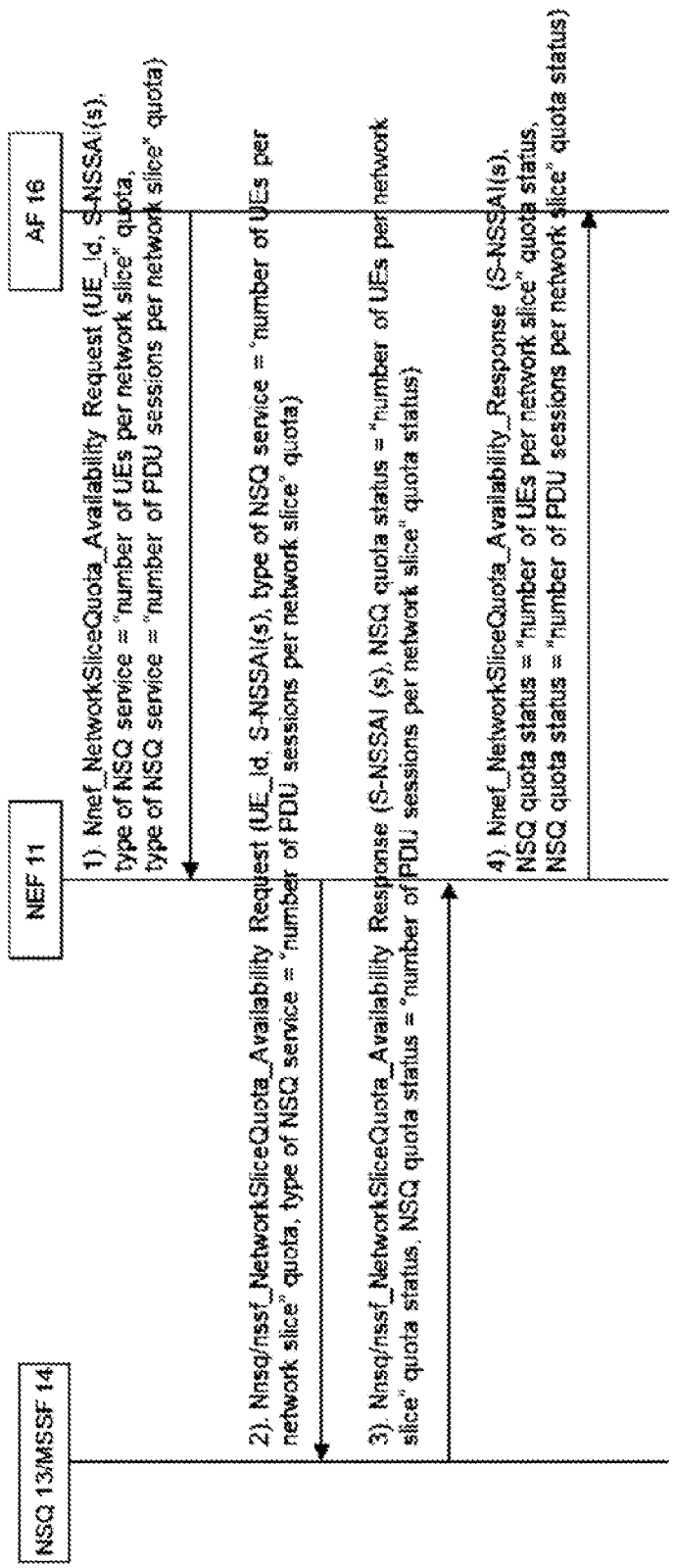
FIG. 15 illustrates schematically an exemplary procedure for Network Slice Quota availability check by the AF via the NEF (Model 3).

FIG. 15 illustrates schematically an exemplary procedure for Network Slice Quota availability check by the AF 16 via the NEF 11 (Model 3), in which:

step 1). Nnef_NetworkSliceQuota_Availability Request (S-NSSAI(s), type of NSQ service="number of UEs per network slice" quota, type of NSQ service="number of PDU sessions per network slice" quota)—the AF 16 sends a request to the NEF 11 for network slice quota availability check, e.g. number of UEs per network slice quota availability. The AF 16 includes as a parameter the UE_Id which indicates the UE 3 to be checked whether the UE 3 is subject for NSQ control or not (e.g. if the UE 3 has previously been registered with the S-NSSAI for which NSQ quota availability is to be checked and is still in the list of UEs registered with that S-NSSAI); S-NSSAI(s) for which the AF 16 wishes to check the quota availability, e.g. the S-NSSAI_1 and the type of NSQ service, e.g. "number of UEs per network slice" quota.

step 2). Nnsq/nssf_NetworkSliceQuota_Availability Request (UE_Id, S-NSSAI(s), type of NSQ service="number UEs per network slice" quota, type of NSQ service="number of PDU sessions per network slice" quota)—The NEF 11 forwards the request to the NSQ 13/NSSF 14.

step 3). The NSQ 13/NSSF 14 responds to the NEF 11 with the Nnsq/nssf_NetworkSliceQuota_Availability Response (S-NSSAI(s), NSQ quota status="number of UEs per network slice" quota status, NSQ quota status="number of PDU sessions per network slice" quota status) message. The NSQ 13/NSSF 14 includes as a parameter S-NSSAI(s) for which the reported quota is applicable, e.g. the S-NSSAI_1 along with the available quota, e.g. number of UEs per network slice quota status (NSQ quota status).

step 4). The NEF 11 forward the message from the NSQ 13/NSSF 14 to AF 16 in the Nnef_NetworkSliceQuota_Availability Response (S-NSSAI(s), NSQ quota status="number UEs per network slice" quota status, NSQ quota status="number of PDU sessions per network slice" quota status).

Network Slice Quota Update

Figure 16:
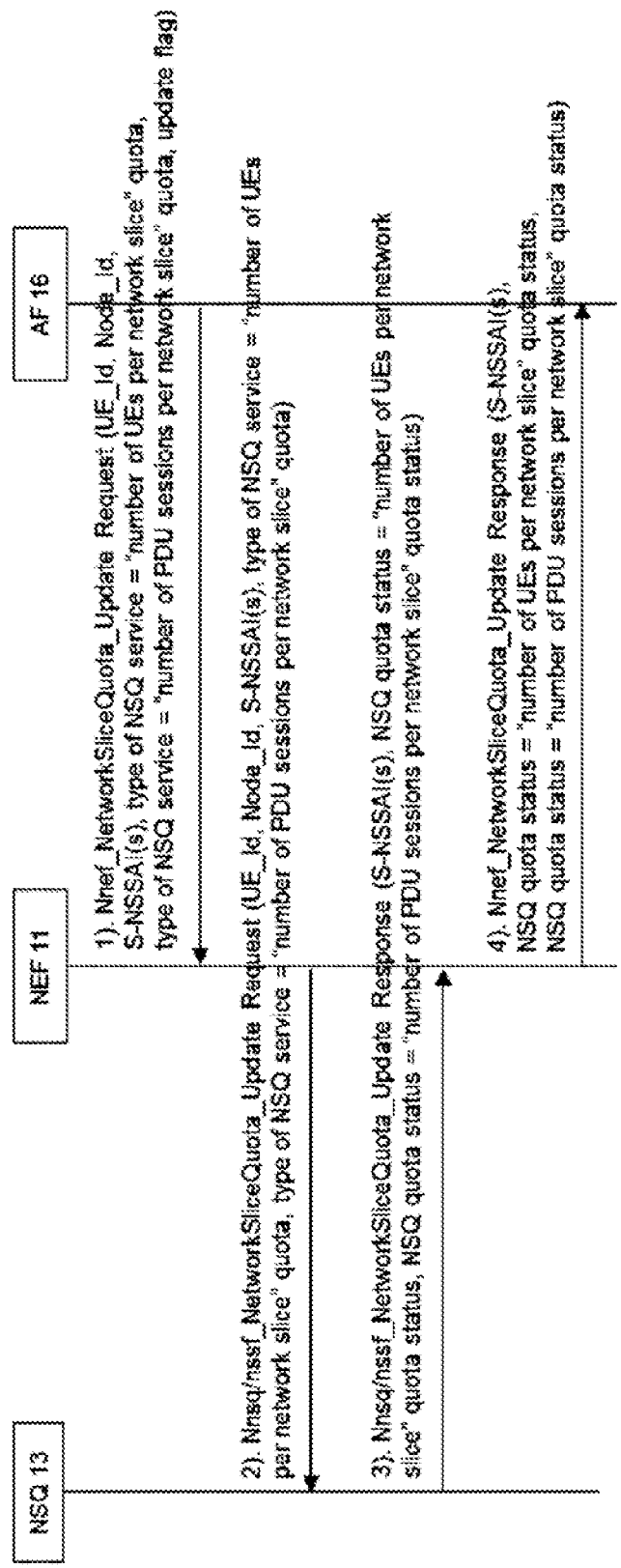
FIG. 16 illustrates schematically an exemplary procedure for Network Slice Quota update by the AF via the NEF (Model 3).

FIG. 16 illustrates schematically an exemplary procedure for Network Slice Quota update by the AF 16 via the NEF 11 (Model 3), in which:

step 1). Nnef_NetworkSliceQuota_Update Request (UE_Id, S-NSSAI(s), type of NSQ service="number of UEs per network slice" quota, type of NSQ service="number of PDU sessions per network slice" quota, update_flag)—the AF 16 sends a request to the NEF for network slice quota update, e.g. number of UEs per network slice quota update. The AF 16 includes as a parameter the UE_Id; The Node_Id which indicates a node identifier, for example an AMF Name with a globally unique FQDN format, where the Nnsq/nssf_NetworkSliceQuota_Update Request message comes from. In case there is a Node_Id but no UE_Id(s) and the update_flag is set to "decrement" in the Nnsq/nssf_NetworkSliceQuota_Update Request message, the NSQ 13/NSSF 14 decrements the number of registered UE(s) in the NSQ 13/NSSF 14 which are associated with the Node_Id; the S-NSSAI(s) for which the AF 16 wishes to update the quota, e.g. the S-NSSAI_1; the type of NSQ service, e.g. "number of UEs per network slice" quota and the update flag which is to indicate whether the quota shall be incremented or decremented.

step 2). Nnsq/nssq_NetworkSliceQuota_Update Request (UE_Id, Node_Id, S-NSSAI(s), type of NSQ service="number of UEs per network slice" quota, type of NSQ service="number of PDU sessions per network slice" quota, update_flag)—The NEF 11 forwards the request to the NSQ 13/NSSF 14.

step 3). The NSQ 13/NSSF 14 responds to the NEF 11 with the Nnsq/nssf_NetworkSliceQuota_Update Response (S-NSSAI(s), NSQ quota status="number of UEs per network slice" quota status, NSQ quota status="number of PDU sessions per network slice" quota status) message. The NSQ 13/NSSF 14 includes as a parameter S-NSSAI(s) for which the reported quota status is applicable, e.g. the S-NSSAI_1 along with the available quota, e.g. number of UEs per network slice quota status (NSQ quota status).

step 4). The NEF 11 forwards the message from the NSQ 13/NSSF 14 to the AF 16 in the Nnef_NetworkSliceQuota_Update Response (S-NSSAI(s), NSQ quota status="number UEs per network slice" quota status, NSQ quota status="number of PDU sessions per network slice" quota status).

Network Slice Quota Notify

Figure 17:
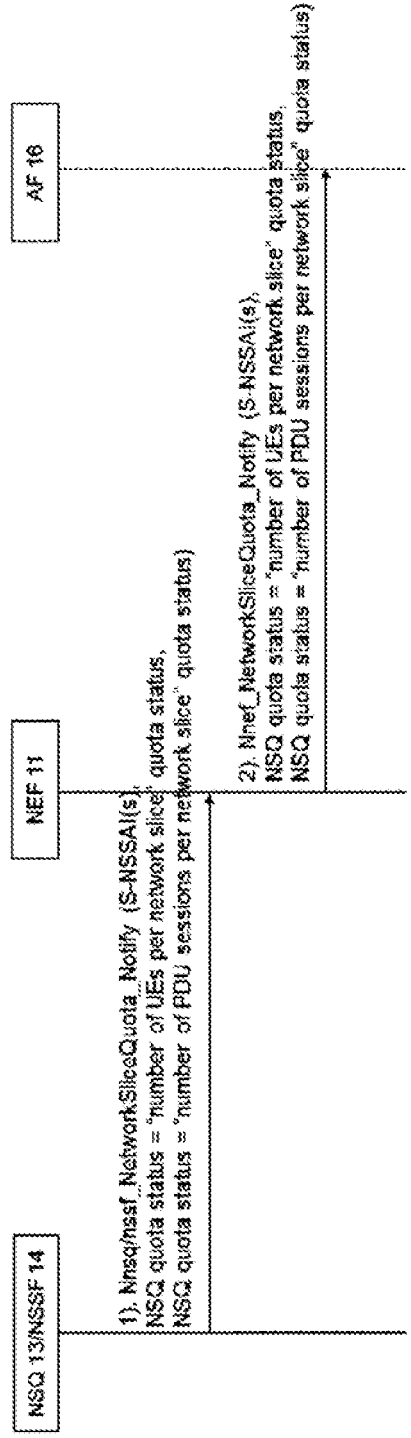
FIG. 17 illustrates schematically an exemplary procedure for Network Slice Quota Notification to the AF via the NEF (Model 3).

FIG. 17 illustrates schematically an exemplary procedure for Network Slice Quota Notification to the AF 16 via the NEF 11 (Model 3), in which:

step 1). Nnsq/nssf_NetworkSliceQuota_Notify (S-NSSAI(s), NSQ quota status="number of UEs per network slice" quota status, NSQ quota status="number of PDU sessions per network slice" quota status)—The NSQ 13/NSSF 14 sends a notification on network slice quota status. The NSQ 13/NSSF 14 includes as a parameter S-NSSAI(s) for which the reported quota status is applicable, e.g. the S-NSSAI_1 along with the available quota, e.g. number of UEs per network slice quota status (NSQ quota status). The notification could be triggered periodically or triggered by an event or threshold based on the notification subscription by the AF 16.

step 2). The NEF 11 forwards the request to the AF 16—Nnef_NetworkSliceQuota_Notification (S-NSSAI(s), NSQ quota status="number of UEs per network slice" quota status, NSQ quota status="number of PDU sessions per network slice" quota status).

Summary

Beneficially, the above described example aspects include, although they are not limited to, one or more of the following functionalities:

Number of UEs per network slice monitoring, update and enforcement in roaming by the hPLMN. The global quota (home use and use in roaming) is managed by the hNSQ.

step 1). Number of UEs per S-NSSAI quota check with the hNSQ in roaming.

Input—vAMF requests for quota availability check with the NetworkSliceQuota_Availability Request message the hNSQ via hUDM route and includes the S-NSSAI(s) subject to quota check and a flag to indicate which type of quota to check.

Processing—the hNSQ checks whether the requested quota is available

Output—The hNSQ returns the quota available/not available result to the vAMF via the hUDM route. Based on the output, the vAMF EITHER cancels the registration in roaming and rejects the S-NSSAI(s) for which the quota is not available thus enforcing the quota restrictions and also saving time, resources and signaling OR continues with the registration procedure with vPLMN if the quota is available.

step 2). Number of UEs per S-NSSAI quota update with hNSQ in roaming.

Input—vAMF requests for quota update with the NetworkSliceQuota_Update Request message the hNSQ via hUDM route in which it includes the UE_Id, S-NSSAI(s) subject to quota update and an update_flag to indicate increase or decrease of the UEs in the network slice.

Processing—the hNSQ increases or decreases the quota based on the request from the vAMF. The hNSQ also adds or removes the UE_Id to/from a list/table so that the quota is verifiable.

Output—The hNSQ responds to the vAMF with NetworkSliceQuota_Update Response via the hUDM route and indicates the S-NSSAI(s) and it may also indicate the current quota status.

Number of UEs per network slice monitoring, update and enforcement in roaming by the vPLMN. The global quota is distributed between all PLMNs (hPLMN and vPLMNs). The quota in roaming is managed by the vNSQ separately by the rest of the quotas (i.e. managed per vPLMN). The quota in the vPLMN may optionally be regularly notified to the hPLMN.

step 1). Number of UEs per S-NSSAI quota check with the vNSQ in roaming.

Input—vAMF requests for quota availability check with the NetworkSliceQuota_Availability Request message the vNSQ and includes the S-NSSAI(s) subject to quota check a flag to indicate which type of quota to check.

Processing—the vNSQ checks whether the quota for the requested S-NSSAI is available in roaming.

Output—The vNSQ returns the quota available/not available result to the vAMF. Based on the output, the vAMF EITHER cancels the registration in roaming and rejects the S-NSSAI(s) for which the quota is not available in roaming thus enforces the quota restrictions and also saves time, resources and signaling OR continues with the registration procedure with vPLMN if the quota is available. The vNSQ may also indicate the available quota to the hNSQ via the hUDM route in case the hNSQ is managing the global quota. This allows for the hPLMN to re-distribute the quota numbers between the roaming partners (vPLMNs) if needed.

step 2). Number of UEs per S-NSSAI quota update with vNSQ in roaming.

Input—vAMF requests for quota update with the NetworkSliceQuota_Update Request message the vNSQ in which it includes the UE_Id, S-NSSAI(s) subject to quota update and a flag which indicates to increase or decrease of the quota.

Processing—the vNSQ increases or decreases the quota based on the request from the vAMF. The vNSQ also adds or removes the UE_Id in/from a list/table so that the quota is verifiable.

Output—The vNSQ responds to the vAMF with NetworkSliceQuota_Update Response and indicates the S-NSSAI(s) and it may also indicate the current quota status. vAMF finalises the registration procedure in roaming.

Number of UEs per network slice monitoring, update and enforcement in roaming by the Service Provider's Application Function (AF). The AF subscribes for Network Slice Quota services of quota availability check, quota update and quota notification with the NSQ and accesses these services via the NEF.

In order to provide these functionalities, the above example aspects describe exemplary methods comprising (at least some of) the following steps.

Number of UEs per network slice monitoring, update and enforcement in roaming by the hPLMN. The global quota (home use and use in roaming) is managed by the hNSQ.

step 1). Number of UEs per S-NSSAI quota check with the hNSQ in roaming.

step 2). Number of UEs per S-NSSAI quota update with hNSQ in roaming.

Number of UEs per network slice monitoring, update and enforcement in roaming by the vPLMN. The global quota is distributed between all PLMNs (hPLMN and vPLMNs). The quota in roaming is managed by the vNSQ separately by the rest of the quotas (i.e. managed per vPLMN). The quota in the vPLMN may optionally be regularly notified to the hPLMN.

step 1). Number of UEs per S-NSSAI quota check with the vNSQ in roaming.

step 2). Number of UEs per S-NSSAI quota update with vNSQ in roaming.

Number of UEs per network slice monitoring, update and enforcement in roaming by the Service Provider's Application (AF). The AF subscribes for Network Slice Quota services of quota availability check, quota update and quota notification with the NSQ and accesses these services via the NEF.

Benefits

The above described example aspects allow for monitoring and control of the number of the UEs registered in a Network Slices in roaming. The example aspects also allow enforcing access and service restrictions in a network slice for roaming UEs when the maximum number of UEs per network slice quota is reached.

System Overview

Figure 18:
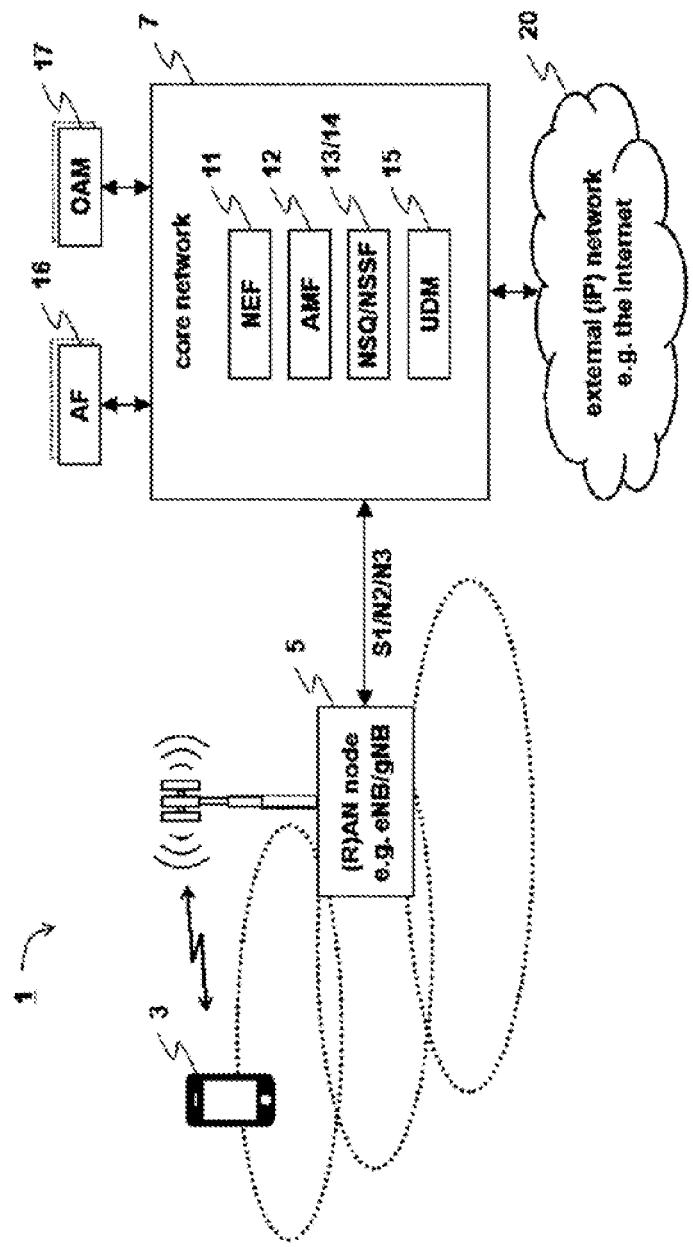
FIG. 18 schematically illustrates a mobile (cellular or wireless) telecommunication system 1 to which the above example aspects are applicable.

FIG. 18 schematically illustrates a mobile (cellular or wireless) telecommunication system 1 to which the above example aspects are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 (RAN) are shown in FIG. 18 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like). Non-Access-Stratum (NAS) interface (such as the so-called 'N1' interface, and/or the like) is connected between the mobile device 3 and the core network node via the base station 5.

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: a Network Exposure Function (NEF) 11, an Access and Mobility Management Function (AMF) 12; a Network Slice Quota (NSQ) 13/Network Slice Selection Function (NSSF) 14; and a Unified Data Management (UDM) function 15. The core network 7 is also couple to at least one Application Function (AF) 16 and an Operations and Maintenance (OAM) entity 17. From the core network 7, connection to an external IP network/data network 20 (such as the Internet) is also provided.

The components of this system 1 are configured to perform one or more of the above described example aspects.

User Equipment (UE)

Figure 19:
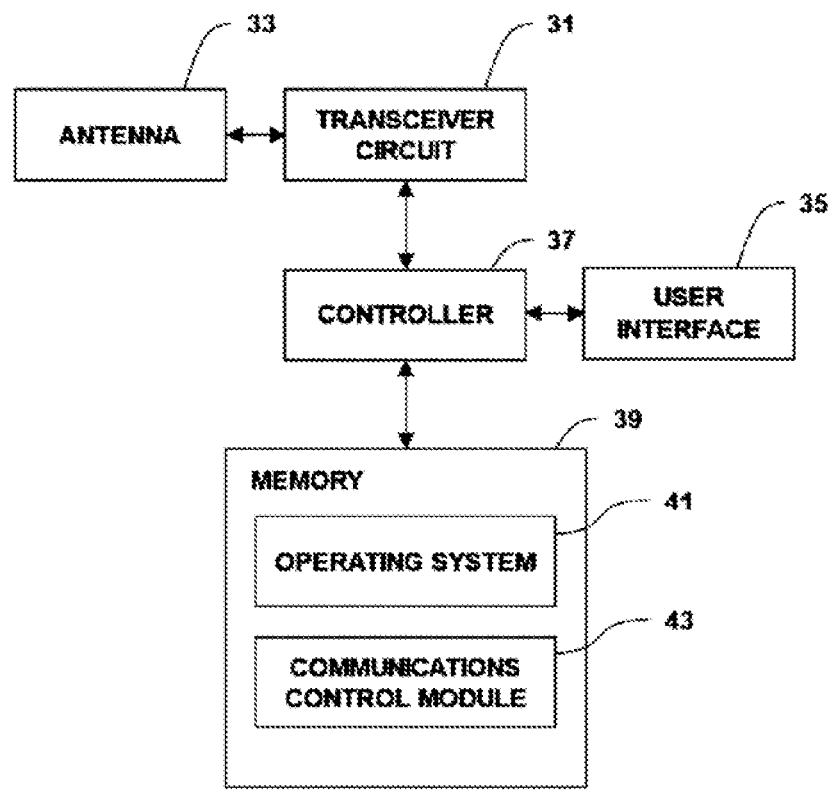
FIG. 19 is a block diagram illustrating the main components of the UE (mobile device 3).

FIG. 19 is a block diagram illustrating the main components of the UE (mobile device 3) shown in FIG. 18. As shown, the UE includes a transceiver circuit 31 which is operable to transmit signals to and to receive signals from the connected node(s) via one or more antenna 33. Although not necessarily shown in FIG. 19, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signaling messages and uplink/downlink data packets between the UE 3 and other nodes, including (R)AN nodes 5, application functions, and core network nodes. Such signaling includes appropriately formatted requests and responses relating to network slice quota management.

(R)AN Node

Figure 20:
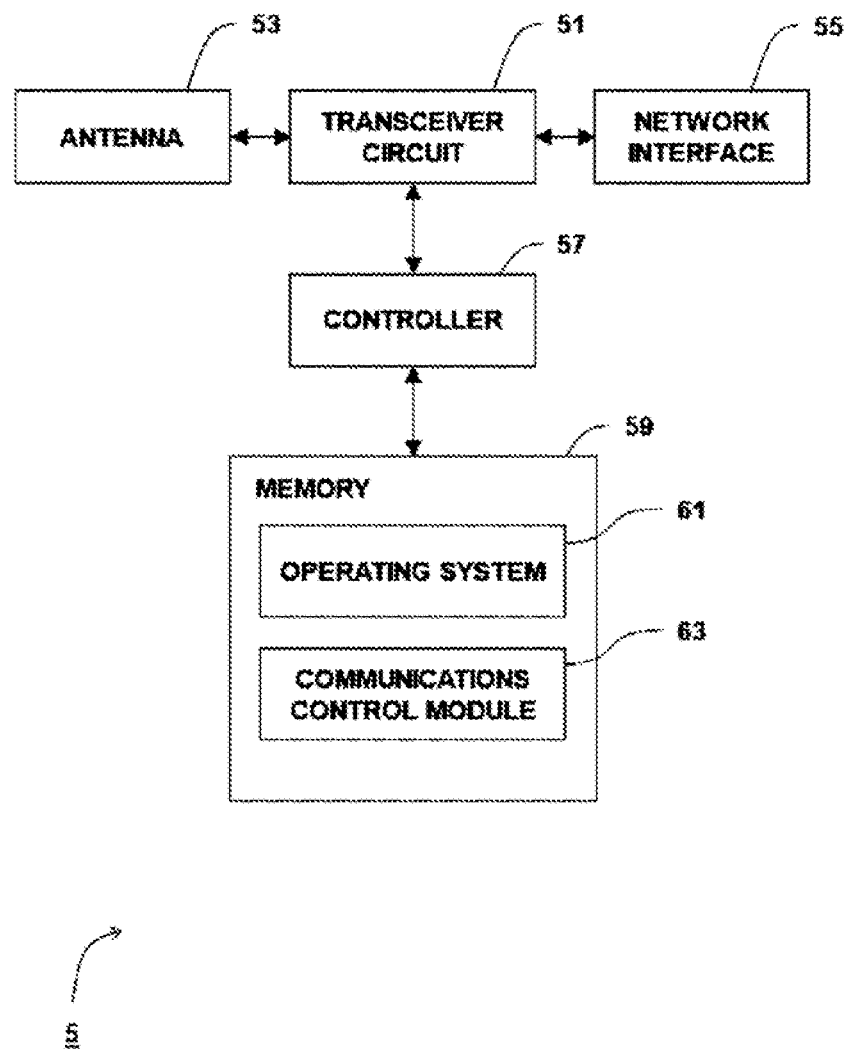
FIG. 20 is a block diagram illustrating the main components of an exemplary (R)AN node 5 (base station).

FIG. 20 is a block diagram illustrating the main components of an exemplary (R)AN node 5 (base station) shown in FIG. 18. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signaling between the (R)AN node 5 and other nodes, such as the UE 3, the AF 16, the OAM 17, and the core network nodes. Such signaling includes appropriately formatted requests and responses relating to network slice quota management.

Core Network Node

Figure 21:
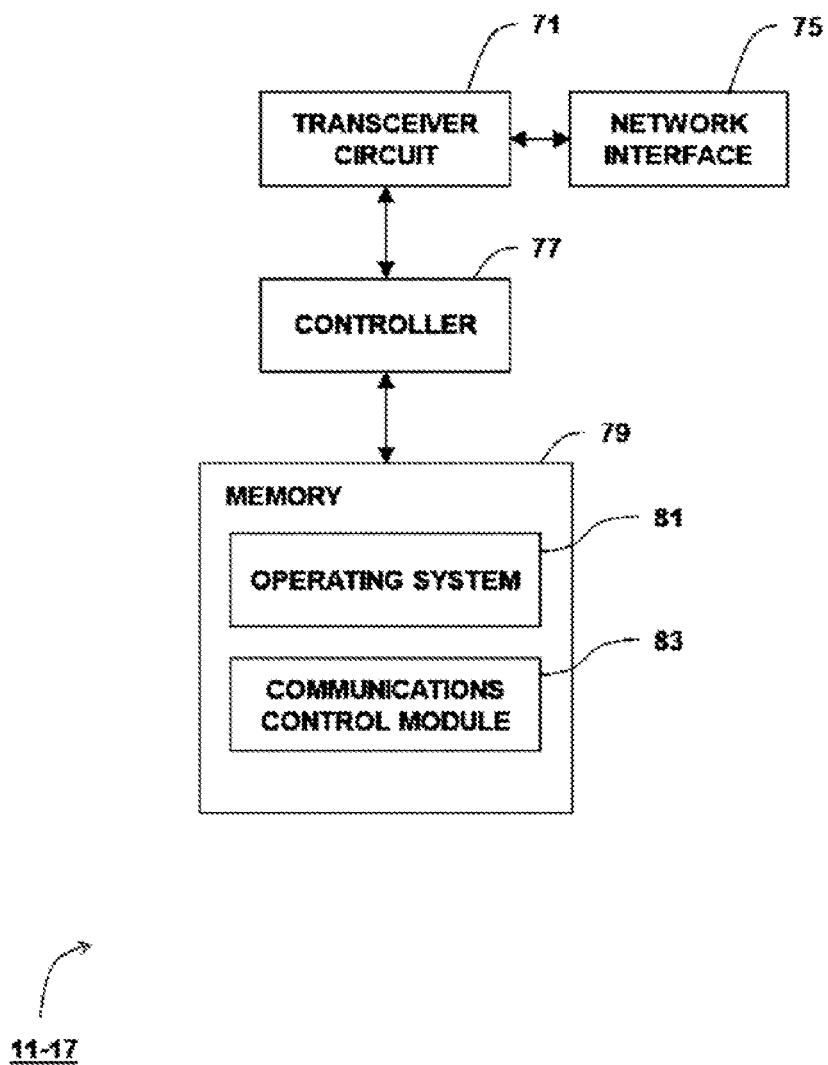
FIG. 21 is a block diagram illustrating the main components of a generic core network node (or function).

FIG. 21 is a block diagram illustrating the main components of a generic core network node (or function) shown in FIG. 18, for example, the NEF 11, the AMF 12, the NSQ/NSSF 13/14, and the UDM 15. It will be appreciated that the same block diagram may be applicable to the AF 16, and the OAM entity 17. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to network slice quota management.

Modifications and Alternatives

Detailed example aspects have been described above. As those skilled in the art will appreciate, a number of modifications and alternatives can be made to the above example aspects whilst still benefiting from the disclosure embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the above example aspects, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example aspects, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above example aspects are also applicable to 'non-mobile' or generally stationary user equipment.

Various other modifications will be apparent to those skilled in the art and will not be described in further detail here.

LIST OF REFERENCES

[1] 3GPP TR 21.905: "Vocabulary for 3GPP Specifications". V15.0.0 (2018 March)
[2] 3GPP TS 23.501: "System Architecture for the 5G System; Stage 2". V16.1.0 (2019 June)—http://www.3gpp.org/ftp/Specs/archive/23_series/23.501/23501-g20.zip

[3] 3GPP TS 23.502: "Procedures for the 5G System; Stage 2" V16.140 (2019 June)—http://www.3gpp.org/ftp/Specs/archive/23_series/23.502/23502-g20.zip
[4] Generic Network Slice Template https://www.gsma.com/newsroom/wp-content/uploads/NG.116-v1.0.pdf
[5] SA2 SID on Enhancement of Network Slicing Phase 2 agreed in SA2 #134 24-28 June 2019, Sapporo, Japan http://www.3gpp.org/ftp/Specs/archive/23_series/23.700-40/23700-40-020.zip This application is based upon and claims the benefit of priority from European Patent Application No. 19219053.6, filed on Dec. 20, 2019, the disclosure of which are incorporated herein in their entirety by reference.

REFERENCE SIGN LIST

1 MOBILE (CELLULAR OR WIRELESS) TELECOMMUNICATION SYSTEM
3 MOBILE DEVICE (UE)
5 BASE STATION
7 CORE NETWORK
11 NETWORK EXPOSURE FUNCTION (NEF)
12 ACCESS AND MOBILITY MANAGEMENT FUNCTION (AMF)
13 NETWORK SLICE QUOTA (NSQ)
14 NETWORK SLICE SELECTION FUNCTION (NSSF)
15 UNIFIED DATA MANAGEMENT (UDM) FUNCTION
16 APPLICATION FUNCTION (AF)
17 OPERATIONS AND MAINTENANCE (OAM) ENTITY
20 external IP network
31 TRANSCEIVER CIRCUIT
33 ANTENNA
35 USER INTERFACE
37 CONTROLLER
39 MEMORY
41 OPERATING SYSTEM
43 COMMUNICATIONS CONTROL MODULE
51 TRANSCEIVER CIRCUIT
53 ANTENNA
55 NETWORK INTERFACE
57 CONTROLLER
59 MEMORY
61 OPERATING SYSTEM
63 COMMUNICATIONS CONTROL MODULE
71 TRANSCEIVER CIRCUIT
75 NETWORK INTERFACE
77 CONTROLLER
79 MEMORY
81 OPERATING SYSTEM
83 COMMUNICATIONS CONTROL MODULE

What is claimed is:

1. A Network Function node for network slice quota, comprising:
a memory storing instructions; and
at least one processor configured to execute the instructions to:
receive a first request, from a core network node in a core network, for checking availability of a network slice, the first request comprising information indicating the network slice;
check the availability of the network slice based on a number of User Equipment (UEs) corresponding to the network slice;
send, to the core network node, a first response based on the checking of the availability of the network slice;
receive, from the core network node, an update flag corresponding to the number of the UEs registered to the network slice; and
update the number of the UEs registered to the network slice based on the update flag,
wherein the core network node is included in a visited Public Land Mobile Network (PLMN).

2. The Network Function node for network slice quota according to claim 1, wherein
the first response instructs the core network node to accept a registration procedure for a UE in a case where the network slice is determined to be available based on the checking of the availability of the network slice.

3. The Network Function node for network slice quota according to claim 1, wherein
the Network Function node for network slice quota is included in a home PLMN.

4. The Network Function node for network slice quota according to claim 1, wherein the at least one processor is configured to:
receive, from the core network node, a second request comprising the update flag; and
send, to the core network node, a second response based on a result of the updating the number of the UE registered to the network slice.

5. The Network Function node for network slice quota according to claim 4, wherein
the update flag includes information for the number of UEs registered to the network slice to be increased or decreased, and
the at update increases or decreases the number of UEs registered to the network slice.

6. The Network Function node for network slice quota according to claim 5, wherein
the update flag indicates that the number of UEs registered to the network slice is to be decreased in a case where the second request is sent due to a registration procedure of UE.

7. The Network Function node for network slice quota according to claim 5, wherein
the update flag indicates that the number of UEs registered to network slice is to be increased in a case where the second request is sent due to a deregistration procedure of UE.

8. The Network Function node for network slice quota according to claim 5, wherein
the network slice quota on the number of UEs registered to the network slice comprises a list of identities of UEs,
the second request comprises an identity of a first UE, and
the at least one processor is further configured to update the number of UEs registered to network slice, by adding the identity of the first UE in the second request to the list or deleting the identity of the first UE in the second request from the list.

9. A core network node in a core network, comprising:
a memory storing instructions; and
at least one processor configured to execute the instructions to:
send a first request, to a Network Function node, for checking availability of a network slice, the first request comprising information indicating the network slice;

receive, from the Network Function node, a first response based on the checking of the availability of the network slice based on a number of User Equipment (UEs) corresponding to the network slice; and send, to the Network Function node, an update flag corresponding to the number of the UEs registered to the network slice, wherein the core network node is included in a visited Public Land Mobile Network (PLMN).

10. The core network node according to claim 9, wherein the at least one processor is further configured to reject a registration procedure for an UE based on the number of UE per network slice.

11. The core network node according to claim 9, wherein the at least one processor is further configured to accept a registration procedure for an UE in a case where the network slice is available based on the number of UE per network slice.

12. The core network node according to claim 10, wherein the registration procedure for the UE includes a registration procedure for an inbound roaming UE, and the core network node is included in a visited Public Land Mobile Network, PLMN, of the inbound roaming UE.

13. The core network node according to claim 12, wherein the Network Function node for network slice quota is included in a home PLMN of the inbound roaming UE.

14. The core network node according to claim 9, wherein the at least one processor is further configured to:

send, to the Network Function node, a second request comprising the update flag; and receive, from the Network Function node, a second response based on a result of the updating the number of the UE registered to the network slice.

15. The core network node according to claim 14, wherein the update flag includes information for the number of UEs registered to the network slice to be increased or decreased.

16. The core network node according to claim 15, wherein the update flag indicates that the number of UEs registered to the network slice is to be decreased, in a case of a registration procedure of UE.

17. The core network node according to claim 15, wherein the update flag indicates that the number of UEs registered to the network slice is to be increased, in a case of a deregistration procedure of UE.

18. The core network node according to claim 15, wherein the second request comprises an identity of UE to be added to a list of identities of UEs or deleted from the list of identities of UEs.

19. A controlling method for a Network Function node for network slice quota, the controlling method comprising:

receiving a first request, from a core network node in a core network, for checking availability of a network slice, the first request comprising information indicating the network slice;

checking the availability of the network slice based on a number of User Equipment (UEs) corresponding to the network slice; and sending, to the core network node, a first response based on the checking of the availability of the network slice;

receive, from the core network node, an update flag corresponding to the number of the UEs registered to the network slice; and update the number of the UEs registered to the network slice based on the update flag, wherein the core network node is included in a visited Public Land Mobile Network (PLMN) of the UE.

20. The controlling method according to claim 19, wherein the first response instructs the core network node to accept a registration procedure for UE in a case where the network slice is determined to be available based on the checking of the availability of the network slice.

21. The controlling method according to claim 19, wherein the Network Function node for network slice quota is included in a home PLMN.

22. The controlling method according to claim 19, further comprising:

receiving, from the core network node, a second request comprising the update flag; and sending, to the core network node, a second response based on a result of the updating the number of the UE registered to the network slice.

23. The controlling method according to claim 22, wherein the update flag includes information for the number of UEs registered to the network slice to be increased or decreased, and the updating increases or decreases the number of UEs registered to the network slice.

24. The controlling method according to claim 23, wherein the update flag indicates that the number of UEs registered to the network slice is to be decreased in a case where the second request is sent due to a registration procedure of UE.

25. The controlling method according to claim 23, wherein the update flag indicates that the number of UEs registered to the network slice is to be increased in a case where the second request is sent due to a deregistration procedure of UE.

26. The controlling method according to claim 23, wherein the network slice quota on the number of UEs registered to the network slice comprises a list of identities of UEs, the second request comprises an identity of a first UE, and the updating includes updating the number of UEs registered to the network slice, by adding the identity of the first UE in the second request to the list or deleting the identity of the first UE in the second request from the list.

27. A controlling method for a core network node in a core network, the controlling method comprising:

sending a first request, to a Network Function node, for checking availability of a network slice, the request comprising information indicating the network slice;

receiving, from the Network Function node, a first response based on the checking of the availability of the network slice based on a number of User Equipment (UEs) corresponding to the network slice; and send, to the Network Function node, an update flag corresponding to the number of the UEs registered to the network slice, wherein the core network node is included in a visited Public Land Mobile Network (PLMN).

28. The controlling method according to claim 27, further comprising:

rejecting a registration procedure for an UE based on the number of UE per network slice.

29. The controlling method according to claim 27, further comprising:

accepting a registration procedure for an UE in a case where the network slice is available based on the number of UE per network slice.

30. The controlling method according to claim 28, wherein
the registration procedure for the UE includes a registration procedure for an inbound roaming UE, and
the core network node is included in a visited Public Land Mobile Network, PLMN, of the inbound roaming UE.

31. The controlling method according to claim 30, wherein
the Network Function node for network slice quota is included in a home PLMN of the inbound roaming UE.

32. The controlling method according to claim 27, further comprising:
sending, to the Network Function node, a second request comprising the update flag; and
receiving, from the Network Function node, a second response based on a result of the updating the number of the UE registered to the network slice.

33. The controlling method according to claim 32, wherein
the update flag includes information for the number of UEs registered to the network slice to be increased or decreased.

34. The controlling method according to claim 33, wherein
the update flag indicates that the number of UEs registered to network slice is to be decreased, in a case of a registration procedure of UE.

35. The controlling method according to claim 33, wherein
the update flag indicates that the number of UEs registered to network slice is to be increased, in a case of a deregistration procedure of UE.

36. The controlling method according to claim 33, wherein
the second request comprises an identity of UE to be added to a list of identities of UEs or deleted from the list of identities of UEs.

37. A communication system comprising
a Network Function node for network slice quota configured to:
receive a first request, from a core network node in a core network directly, for checking availability of a network slice, the first request comprising information indicating the network slice;
check the availability of the network slice based on a number of User Equipment (UEs) corresponding to the network slice;
send, to the core network node directly, a first response based on the checking of the availability of the network slice;
receive, from the core network node, an update flag corresponding to the number of the UEs registered to the network slice; and
update the number of the UEs registered to the network slice based on the update flag, and
a core network node in a core network configured to:
send the first request, to the Network Function node, for checking the availability of the network slice, the first request comprising information indicating the network slice;
receive, from the Network Function node, the first response based on the checking of the availability of the of the network slice; and
send, to the Network Function node, the update flag corresponding to the number of the UEs registered to the network slice,
wherein the core network node is included in a visited Public Land Mobile Network (PLMN).

38. The Network Function node for network slice quota according to claim 1, wherein the UE is included in the visited PLMN.

39. The controlling method according to claim 19, wherein the UE is included in the visited PLMN.

40. The Network Function node for network slice quota according to claim 1, wherein the processor is configured to:
receive, from the core network node, a UE identity; and
remove the UE identity, from a UE list registered with the network slice, based on the update flag.

41. The core network node according to claim 9, wherein the processor is configured to send, to the Network Function node, a UE identity to be removed from a UE list registered with the network slice based on the update flag.

42. The controlling method according to claim 19, further comprising:
receiving, from the core network node, a UE identity; and
removing the UE identity, from a UE list registered with the network slice, based on the update flag.

43. The controlling method according to claim 27, further comprising:
sending, to the Network Function node, a UE identity to be removed from a UE list registered with the network slice based on the update flag.

* * * * *